United States Patent
Monden

(10) Patent No.: US 11,084,903 B2
(45) Date of Patent: *Aug. 10, 2021

(54) AROMATIC POLYCARBONATE RESIN, AROMATIC POLYCARBONATE RESIN COMPOSITION, AND METHOD FOR MANUFACTURING AROMATIC POLYCARBONATE RESIN MOLDED BODY

(71) Applicant: Mitsubishi Chemical Corporation, Chiyoda-ku (JP)

(72) Inventor: Toshiki Monden, Chiyoda-ku (JP)

(73) Assignee: Mitsubishi Chemical Corporation, Chiyoda-ku (JP)

(*) Notice: Subject to any disclaimer, the term of this patent is extended or adjusted under 35 U.S.C. 154(b) by 319 days.

This patent is subject to a terminal disclaimer.

(21) Appl. No.: 16/003,635

(22) Filed: Jun. 8, 2018

(65) Prior Publication Data

US 2018/0291145 A1 Oct. 11, 2018

Related U.S. Application Data

(63) Continuation of application No. PCT/JP2016/086762, filed on Dec. 9, 2016.

(30) Foreign Application Priority Data

Dec. 11, 2015 (JP) ............... JP2015-242170
Dec. 18, 2015 (JP) ............... JP2015-247592
Dec. 21, 2015 (JP) ............... JP2015-248695

(51) Int. Cl.
| | | |
|---|---|---|
| *C08G 64/06* | (2006.01) | |
| *C08G 64/04* | (2006.01) | |
| *C08L 69/00* | (2006.01) | |
| *C08K 5/00* | (2006.01) | |
| *C08K 5/524* | (2006.01) | |
| *B29C 45/00* | (2006.01) | |
| *C08J 5/00* | (2006.01) | |
| *C08G 65/34* | (2006.01) | |
| *B29K 69/00* | (2006.01) | |
| *B29K 105/00* | (2006.01) | |

(52) U.S. Cl.
CPC .......... *C08G 64/06* (2013.01); *B29C 45/0001* (2013.01); *C08G 64/04* (2013.01); *C08J 5/00* (2013.01); *C08K 5/005* (2013.01); *C08K 5/524* (2013.01); *C08L 69/00* (2013.01); *B29K 2069/00* (2013.01); *B29K 2105/0005* (2013.01); *C08G 65/34* (2013.01); *C08J 2369/00* (2013.01); *C08J 2469/00* (2013.01); *C08L 2201/10* (2013.01); *C08L 2205/025* (2013.01)

(58) Field of Classification Search
USPC ...................... 520/1; 528/196, 198
See application file for complete search history.

(56) References Cited

U.S. PATENT DOCUMENTS

| 4,446,285 | A | 5/1984 | Mark et al. |
| 6,706,847 | B2 * | 3/2004 | Davis ............... C08G 64/06 |
| | | | 362/273 |
| 2003/0187180 | A1 | 10/2003 | Davis et al. |
| 2009/0117478 | A1 | 5/2009 | Ogawa |
| 2014/0364546 | A1 | 12/2014 | Okamoto et al. |

FOREIGN PATENT DOCUMENTS

| JP | 59-131623 | 7/1984 | |
| JP | 5-1144 | 1/1993 | |
| JP | 6-128371 | 5/1994 | |
| JP | 2005-520925 | 7/2005 | |
| JP | 2010037380 | * 8/2008 | ............ C08L 69/00 |
| JP | 2010-37380 | 2/2010 | |
| JP | 2013-139097 | 7/2013 | |
| JP | 2016-155957 | 9/2016 | |
| JP | 2017-31245 | 2/2017 | |
| WO | WO 2007/119548 A1 | 10/2007 | |
| WO | WO 2017/099226 A1 | 6/2017 | |
| WO | WO 2017/099233 A1 | 6/2017 | |

OTHER PUBLICATIONS

English translation of the Notification of Transmittal of translation of the International Preliminary Report on Patentability and Written Opinion dated Jun. 21, 2018 in PCT/JP2016/086762.
Combined Chinese Office Action and Search Report dated Oct. 9, 2019, in Patent Application No. 201680072546.5 (with English translation), 18 pages.
Extended European Search Report dated Nov. 13, 2018 in Patent Application No. 16873120.6.
International Search Report dated Mar. 14, 2017 in PCT/JP2016/086762, filed on Dec. 9, 2016 (with English Translation).
U.S. Appl. No. 16/001,142, filed Jun. 6, 2018, Nishihara et al.
U.S. Appl. No. 16/003,706, filed Jun. 8, 2018, Monden.

* cited by examiner

Primary Examiner — Terressa Boykin
(74) Attorney, Agent, or Firm — Oblon, McClelland, Maier & Neustadt, L.L.P.

(57) ABSTRACT

The present invention provides an aromatic polycarbonate resin having high fluidity and thin-wall moldability as well as excellent transparency, impact strength, and bending resistance; a polycarbonate resin composition containing it; and a method for producing a molded article by injection molding thereof. This object is achieved by an aromatic polycarbonate resin containing a carbonate structural unit (A) represented by Formula (1) and a carbonate structural unit (B) represented by Formula (2), which aromatic polycarbonate resin satisfies the following: (i) the flow value (Q value) as measured using a Koka flow tester according to Appendix C of JIS (1999) K7210 at 240° C. at 160 kgf/cm² is not less than 6 (unit: $10^{-2}$ cm³/sec.); and (ii) the glass transition temperature (Tg) is 90 to 145° C.

12 Claims, No Drawings

AROMATIC POLYCARBONATE RESIN, AROMATIC POLYCARBONATE RESIN COMPOSITION, AND METHOD FOR MANUFACTURING AROMATIC POLYCARBONATE RESIN MOLDED BODY

CROSS-REFERENCE TO RELATED APPLICATION

This is a continuation of International Application PCT/JP2016/086762, filed on Dec. 9, 2016, and designated the U.S., and claims priority from Japanese Patent Application 2015-242170 which was filed on Dec. 11, 2015, Japanese Patent Application 2015-247592 which was filed on Dec. 18, 2015, and Japanese Patent Application 2015-248695 which was filed on Dec. 21, 2015, the entire contents of which are incorporated herein by reference.

TECHNICAL FIELD

The present invention relates to an aromatic polycarbonate resin. More specifically, the present invention relates to an aromatic polycarbonate resin having excellent thin-wall moldability, transparency, impact strength, and bending resistance; a polycarbonate resin composition containing it; and a method for producing a molded article by injection molding thereof.

BACKGROUND ART

In liquid crystal display devices used for personal computers, tablet PCs, smartphones, and the like, planar light source devices are incorporated for complying with demands for thinning, weight reduction, power saving, and higher definition. For the purpose of uniformly and efficiently guiding incident light to the liquid crystal display side, such planar light source devices are provided with a light guide plate having a wedge-shaped cross-section having a uniformly inclined plane on one side, or a flat-plate-shaped light guide plate. In some cases, the light guide plate has an irregular pattern formed on its surface, for imparting light-scattering function.

Such a light guide plate is obtained by injection molding of a thermoplastic resin, and the irregular pattern described above is imparted by transfer of irregularity formed on a surface of an insert. Conventionally, light guide plates have been molded from resin materials such as polymethyl methacrylate (PMMA). However, because of the recent reduction in the thicknesses of light guide plates due to thinning of displays, the mechanical strengths of materials achieved by PMMA have become insufficient, and PMMA is being replaced by polycarbonate resins having relatively high mechanical strength.

Conventional polycarbonate resins have a drawback in that they have lower melt fluidity and remarkably poorer moldability compared to PMMA. In view of this, studies have been carried out in order to improve their moldability for use as materials of molded articles such as those described above.

For example, Patent Document 1 describes an aromatic polycarbonate resin having a viscosity average molecular weight of 10,000 to 15,000 as a polycarbonate resin intended for light guide plate materials, and Patent Document 2 describes an aromatic polycarbonate resin having a viscosity average molecular weight of 11,000 to 22,000 as a polycarbonate resin intended for light guide plate materials. These methods improve the moldability of a polycarbonate resin by decreasing the molecular weight and increasing the melt fluidity of the polycarbonate resin. However, in polymer materials, a decrease in the molecular weight tends to cause, of course, a decrease in the mechanical strength. Thus, the above-described polycarbonate resins also suffer from decreases in the mechanical strength, and their moldability as well as the practical strength of their products have not been sufficient.

On the other hand, a method for improving the moldability by further addition of another dihydroxy compound as monomers to a conventional bisphenol A-type polycarbonate resin has been proposed. For example, Patent Document 3 describes a polycarbonate resin having improved fluidity containing bisphenol A and bisphenol E. Patent Documents 4 and 5 also describe polycarbonate resins having improved fluidity using particular bisphenol compounds. However, such polycarbonate resins also have a problem in that they are impractical because of their extremely low heat resistance, and that, since their fluidity and impact resistance are insufficient for obtaining light guide plates, thin-wall molded articles cannot be obtained.

PRIOR ART DOCUMENTS

Patent Documents

Patent Document 1: JP 2010-37380 A
Patent Document 2: JP 2013-139097 A
Patent Document 3: JP 5-1144 A
Patent Document 4: JP 6-128371 A
Patent Document 5: JP 59-131623 A

SUMMARY OF THE INVENTION

Problems to be Solved by the Invention

In uses for the light guide plates described above, a resin is required to have a fluidity corresponding to that of a common bisphenol A-type polycarbonate resin product having a viscosity average molecular weight of 10,000 to 15,000. In particular, in recent years, the resin is required to have a high fluidity corresponding to that of a product having a viscosity average molecular weight of 10,000 to 13,000. However, since the polycarbonate resins described in Patent Documents 1 to 5 have remarkably low impact strength and bending strength when the fluidity is within the above-described range, the product strength cannot be maintained, and moreover, those resins undergo cracking in the molding process, which is problematic.

In view of the above problems, the present invention aims to provide an aromatic polycarbonate resin having the above-described high fluidity and thin-wall moldability as well as excellent transparency, impact strength, and bending resistance; a polycarbonate resin composition containing it; and a method for producing a molded article by injection molding thereof.

Means for Solving the Problems

As a result of intensive study, the present inventors discovered that an aromatic polycarbonate resin containing particular amounts of structural units derived from two particular kinds of aromatic dihydroxy compounds and having a melt viscosity adjusted to a particular value can have high transparency and the high fluidity required for molding of a thin-wall molded article, as well as high mechanical strength, thereby completing the present invention.

That is, the present invention is constituted by the following [1] to [7].

[1] An aromatic polycarbonate resin comprising:
a carbonate structural unit (A) represented by the following Formula (1):

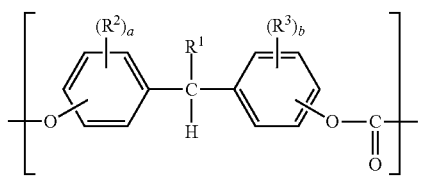

(wherein in Formula (1), $R^1$ represents $C_8$-$C_{16}$ alkyl or alkenyl; $R^2$ and $R^3$ each independently represent a $C_1$-$C_{15}$ monovalent hydrocarbon group; and a and b each independently represent an integer of 0 to 4); and
a carbonate structural unit (B) represented by the following Formula (2):

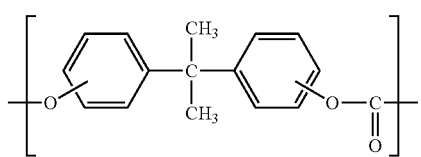

the aromatic polycarbonate resin satisfying the following (i) and (ii):
(i) the flow value (Q value) as measured using a Koka flow tester according to Appendix C of JIS (1999) K7210 at 240° C. at 160 kgf/cm² is not less than 6 (unit: $10^{-2}$ cm³/sec.); and
(ii) the glass transition temperature (Tg) is 90 to 145° C.

[2] The aromatic polycarbonate resin according to [1], wherein the ratio of the carbonate structural unit (A) to the total carbonate structural units in the aromatic polycarbonate resin is 1 to 25 mol %.

[3] The aromatic polycarbonate resin according to [1] or [2], wherein the carbonate structural unit (A) includes at least one of the following carbonate structural units represented by Formulae (3) to (6):

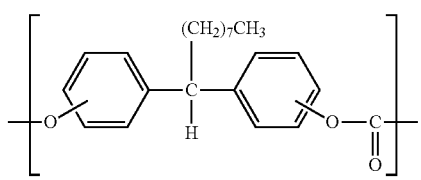

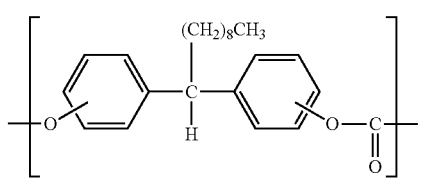

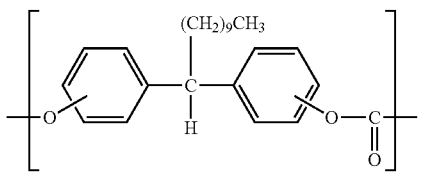

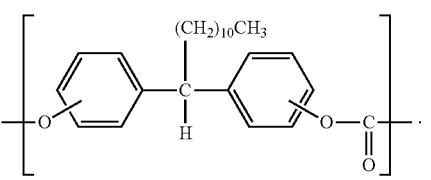

[4] An aromatic polycarbonate resin composition comprising the aromatic polycarbonate resin recited in any one of [1] to [3], and at least one additive selected from the group consisting of heat stabilizers, antioxidants, ultraviolet absorbers, brightness improvers, dyes, pigments, and mold release agents.

[5] The aromatic polycarbonate resin according to any one of [1] to [3], or the aromatic polycarbonate resin composition according to [4], wherein the Izod impact value as measured according to ASTM D256 is not less than 20 J/m.

[6] The aromatic polycarbonate resin or the aromatic polycarbonate resin composition according to [5], wherein the flow value (Q value) as measured using a Koka flow tester according to Appendix C of JIS (1999) K7210 at 240° C. at 160 kgf/cm² is not less than 20 (unit: $10^{-2}$ cm³/sec.).

[7] A method for producing an aromatic polycarbonate resin molded article, the method comprising a step of obtaining a molded article by injection molding of the aromatic polycarbonate resin recited in any one of [1] to [3] or the aromatic polycarbonate resin composition recited in any one of [4] to [6].

Effect of the Invention

By the aromatic polycarbonate resin of the present invention, an aromatic polycarbonate resin material having excellent thin-wall moldability, transparency, impact strength, and bending resistance can be provided. With such an aromatic polycarbonate resin, a molded article having excellent strength, transparency, and heat resistance can be obtained with high productivity even in cases where a large molded article such as a resin glass window is to be obtained and cases where a thin-wall molded article such as a light guide plate is to be obtained. Thus, industrial applicability of such a resin is very high.

MODE FOR CARRYING OUT THE INVENTION

The present invention is described below in more detail by way of embodiments, examples, and the like. However, the present invention should not be interpreted as being limited to the embodiments, examples, and the like described below.

Unless otherwise specified, the term "to" in the present description is used such that the values described before and after it are included as the lower limit and the upper limit, respectively. Unless otherwise specified, the term "part" means part by mass, which is expressed on a mass basis.

Aromatic Polycarbonate Resin

The aromatic polycarbonate resin of the present invention contains a carbonate structural unit (A) represented by the following Formula (1) and a carbonate structural unit (B) represented by the following Formula (2).

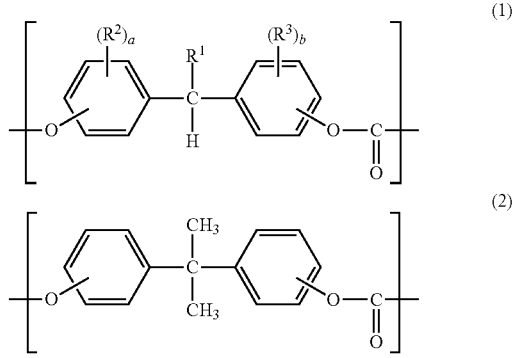

In Formula (1), $R^1$ represents $C_8$-$C_{16}$ alkyl or alkenyl; $R^2$ and $R^3$ each independently represent a $C_1$-$C_{15}$ monovalent hydrocarbon group; and a and b each independently represent an integer of 0 to 4.

By the combination of the carbonate structural unit (A) and the carbonate structural unit (B) at particular ratios, the aromatic polycarbonate resin of the present invention can be provided with a remarkably favorable balance between the fluidity and strengths such as the impact strength, bending strength, and cyclic fatigue strength, as well as with high transparency, hue, and brightness.

In the aromatic polycarbonate resin of the present invention, the carbonate structural unit (A) needs to have, as $R^1$, a long-chain aliphatic chain substituent having not less than 8 carbon atoms. By the inclusion of the carbonate structural unit (A) having such a long-chain aliphatic chain, entangling of polymer chains during melting can be moderately inhibited to reduce friction between the polymer chains, so that high fluidity can be achieved.

Surprisingly, it was found that this effect cannot be sufficiently produced in a viscosity range in which the molecular chain is sufficiently long and the molecular weight is sufficiently high (more specifically, the viscosity range of a bisphenol A-type polycarbonate resin having a viscosity average molecular weight of not less than 17,000), while the effect can be remarkably produced in a high fluidity range in which the molecular weight is lower than this (more specifically, a viscosity range in which the later-described flow value (Q value) as measured using a Koka flow tester according to Appendix C of JIS (1999) K7210 at 240° C. at 160 kgf/cm$^2$ is not less than 6 (unit: $10^{-2}$ cm$^3$/sec.)).

Thus, in the high fluidity range described above, the aromatic polycarbonate resin of the present invention can give higher fluidity compared to a polycarbonate resin that does not contain the carbonate structural unit (A) when the same level of mechanical strength is to be obtained. Further, the aromatic polycarbonate resin of the present invention can exhibit higher mechanical strength when the fluidity is adjusted to the same level.

From such a point of view, the carbon number of the alkyl group or alkenyl group of $R^1$ is more preferably not less than 9, still more preferably not less than 10, especially preferably not less than 11.

On the other hand, the carbon number of the alkyl group or alkenyl group of $R^1$ in the carbonate structural unit (A) is not more than 16. In cases where the long-chain aliphatic chain is too long, the heat resistance and the mechanical strength are remarkably low, and the crystallinity of the long-chain aliphatic chain is high, so that the transparency of the aromatic polycarbonate resin of the present invention may be deteriorated, which is not preferred. From such a point of view, the carbon number of the $R^1$ is more preferably not more than 15, still more preferably not more than 14, especially preferably not more than 13.

Examples of the $C_8$-$C_{16}$ alkyl include linear or branched alkyl groups, and alkyl groups partially having a cyclic structure. In particular, for effective enhancement of the fluidity of the aromatic polycarbonate resin of the present invention, the $C_8$-$C_{16}$ alkyl is preferably a linear or branched alkyl group.

Specific examples of the linear alkyl groups include n-octyl, n-nonyl, n-decyl, n-undecyl, n-dodecyl, n-tridecyl, n-tetradecyl, n-pentadecyl, and n-hexadecyl. n-Nonyl, n-decyl, n-undecyl, n-dodecyl, n-tridecyl, n-tetradecyl, and n-pentadecyl are preferred. n-Decyl, n-undecyl, n-dodecyl, n-tridecyl, and n-tetradecyl are more preferred. n-Undecyl, n-dodecyl, and n-tridecyl are especially preferred. n-Undecyl is most preferred. By the presence of such an alkyl group, the fluidity and the impact resistance of the aromatic polycarbonate resin of the present invention can be more effectively increased.

Specific examples of the branched alkyl groups include methylheptyl, methyloctyl, methylnonyl, methyldecyl, methylundecyl, methyldodecyl, methyltridecyl, methyltetradecyl, methylpentadecyl, dimethylhexyl, dimethylheptyl, dimethyloctyl, dimethylnonyl, dimethyldecyl, dimethylundecyl, dimethyldodecyl, dimethyltridecyl, dimethyltetradecyl, trimethylheptyl, trimethyloctyl, trimethylnonyl, trimethyldecyl, trimethylundecyl, trimethyldodecyl, trimethyltridecyl, ethylhexyl, ethylheptyl, ethyloctyl, ethylnonyl, ethyldecyl, ethylundecyl, ethyldodecyl, ethyltridecyl, ethyltetradecyl, propylpentyl, propylhexyl, propylheptyl, propyloctyl, propylnonyl, propyldecyl, propylundecyl, propyldodecyl, propyltridecyl, butylpentyl, butylhexyl, butylheptyl, butyloctyl, butylnonyl, butyldecyl, butylundecyl, and butyldodecyl.

In the above examples of branched alkyl groups, the position(s) of branching is/are arbitrary.

The alkenyl group is not limited as long as it has a structure wherein one or more carbon-carbon double bonds are included in the structure of a linear alkyl group or branched alkyl group described above. Specific examples of the alkenyl group include octenyl, nonenyl, decenyl, undecenyl, dodecenyl, tridecenyl, tetradecenyl, pentadecenyl, and hexadecenyl.

In the carbonate structural unit (A) described above, the carbon atom to which the substituent of $R^1$ is bound needs to have a hydrogen atom bound thereto. In cases where $R^1$ has a substituent such as an alkyl group instead of the hydrogen atom, the fluidity-modifying effect and the mechanical strength-improving effect described above cannot be obtained, and the heat resistance is extremely deteriorated, which is not preferred.

$R^2$ and $R^3$ in the carbonate structural unit (A) represent $C_1$-$C_{15}$ monovalent hydrocarbon groups. By having the $C_1$-$C_{15}$ monovalent hydrocarbon groups, the aromatic polycarbonate resin of the present invention can have increased fluidity, strength, hardness, chemical resistance, and the like. Examples of the $C_1$-$C_{15}$ monovalent hydrocarbon groups include $C_1$-$C_{15}$ alkyl groups and $C_2$-$C_{15}$ alkenyl groups.

These may be linear, branched, or cyclic. Examples of such monovalent hydrocarbon groups include methyl, ethyl, propyl, isopropyl, n-butyl, isobutyl, sec-butyl, tert-butyl, pentyl, n-hexyl, cyclohexyl, n-heptyl, n-octyl, n-nonyl, n-decyl, n-undecyl, n-dodecyl, n-tridecyl, n-tetradecyl, n-pentadecyl, phenyl, and tolyl. Among these, methyl is preferred.

a and b in the carbonate structural unit (A) each independently represent an integer of 0 to 4, preferably 0 to 2, more preferably 0 or 1, still more preferably 0.

Specific examples of such a carbonate structural unit (A) include the structural units represented by the following Formulae (3) to (9). Among these, the structural units of Formulae (3) to (8) are more preferred; the structural units of Formulae (4) to (7) are still more preferred; the structural units of Formulae (4) to (6) are especially preferred; and the structural unit of Formula (6) is most preferred.

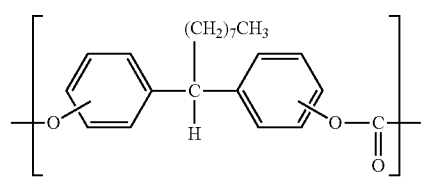

(3)

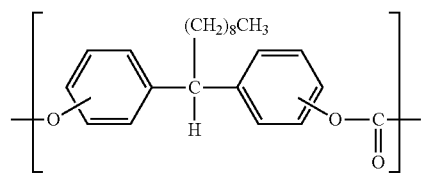

(4)

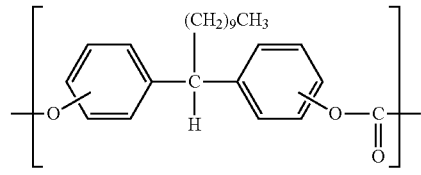

(5)

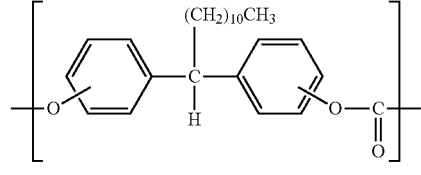

(6)

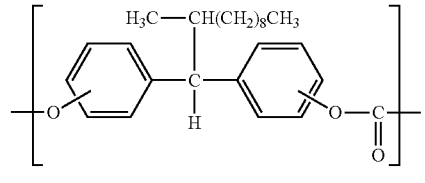

(7)

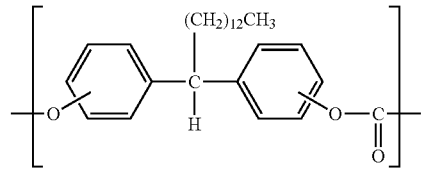

(8)

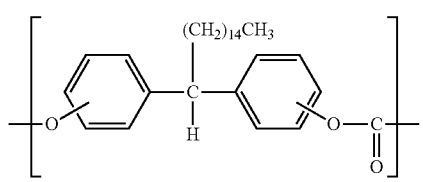

(9)

Specific examples of the carbonate structural unit (A) include the structural units represented by the following Formulae (13) to (15). Among these, the structural unit represented by Formula (13) is more preferred since it tends to increase the thermal stability. However, the isomeric structures of Formulae (14) and (15) may also be included at arbitrary ratios.

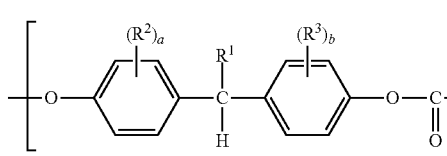

(13)

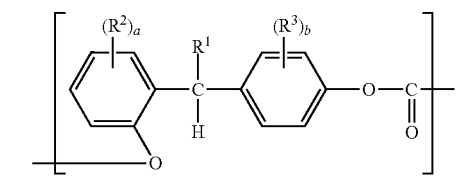

(14)

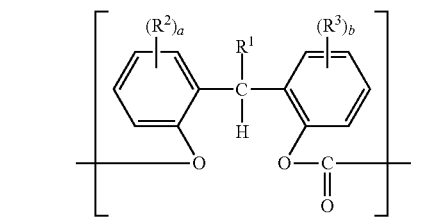

(15)

From such a point of view, more preferred specific examples of the carbonate structure (A) include the structural units represented by the following Formulae (16) to (22). Among these, the structural units of Formulae (16) to (21) are more preferred; the structural units of Formulae (17) to (20) are still more preferred; the structural units of Formulae (17) to (19) are especially preferred; and the structural unit of Formula (19) is most preferred.

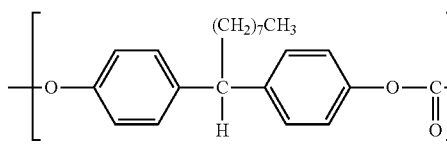

(16)

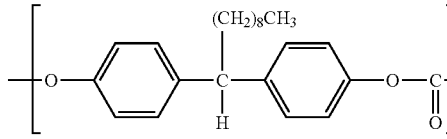

(17)

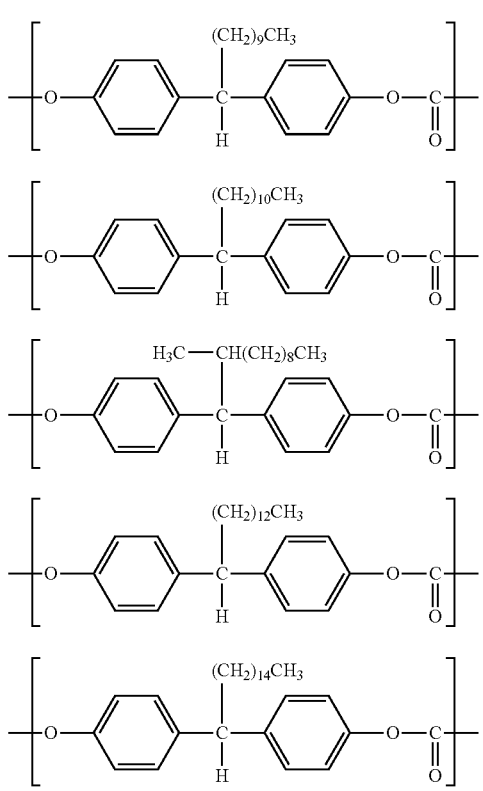

The carbonate structural unit (B) included in the aromatic polycarbonate resin of the present invention is preferably the bisphenol A-derived structural unit represented by the following Formula (26). However, the isomeric structural unit represented by Formula (27) may also be included at an arbitrary ratio.

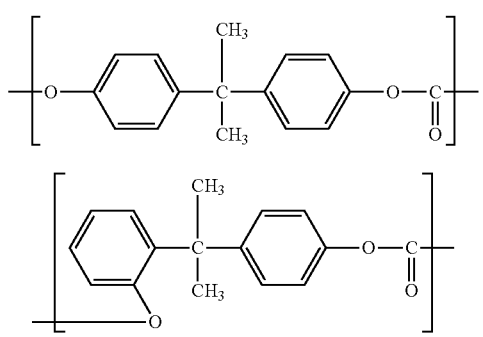

The aromatic polycarbonate resin of the present invention may be either a copolymer composed only of the carbonate structural unit (A) and the carbonate structural unit (B) described above, or a copolymer containing one or more kinds of carbonate structural units each derived from another dihydroxy compound different from the carbonate structural unit (A) and the carbonate structural unit (B). In terms of the form of the copolymer, various forms of copolymers including random copolymers and block copolymers may be selected.

In the aromatic polycarbonate resin of the present invention, the ratio of the carbonate structural unit (A) to the total carbonate structural units in the aromatic polycarbonate resin is not limited as long as the flow value (Q value) and the glass transition temperature (Tg) are within the ranges described later, and may be appropriately selected depending on the type of the carbonate structural unit (A) used and the desired balance between the fluidity and the strength. The ratio is usually 1 to 25 mol %. In cases where the ratio of the carbonate structural unit (A) is less than the lower limit of this range, the fluidity of the aromatic polycarbonate resin of the present invention may be insufficient, while in cases where the ratio exceeds the upper limit of this range, the strength and the heat resistance of the aromatic polycarbonate resin of the present invention may be insufficient. From such a point of view, the ratio of the carbonate structural unit (A) is preferably not less than 1.5 mol %, more preferably not less than 2 mol %, still more preferably not less than 3 mol %, especially preferably not less than 4 mol %, most preferably not less than 5.5 mol %. Further, the ratio is preferably not more than 16 mol %, more preferably not more than 14 mol %, still more preferably not more than 13 mol %, especially preferably not more than 11 mol %. The ratio of the carbonate structural unit (A) to the total carbonate structural units in the aromatic polycarbonate resin has the same meaning as the structural units (blended units) of dihydroxy compounds in the aromatic polycarbonate resin.

In cases where the aromatic polycarbonate resin contains a carbonate structural unit derived from another dihydroxy compound, its content in the resin is not limited as long as the effect of the aromatic polycarbonate resin of the present invention is not inhibited. For example, the ratio of the carbonate structural unit derived from another dihydroxy compound to the total carbonate structural units is usually 0 to 70 mol %, preferably 0 to 50 mol %, more preferably 0 to 40 mol %, still more preferably 0 to 30 mol %, especially preferably 0 to 20 mol %, most preferably 0 to 10 mol %.

Flow Value (Q Value) of Aromatic Polycarbonate Resin

In the aromatic polycarbonate resin of the present invention, the flow value (Q value) as measured using a Koka flow tester according to Appendix C of JIS (1999) K7210 at 240° C. at 160 kgf/cm² is not less than 6 (unit: $10^{-2}$ cm³/sec.). The Q value is an index of the melt viscosity. Unlike MVR (melt volume rate) or MFR (melt flow rate), the Q value represents the melt viscosity in a higher range of shear rate that is close to the actual range in injection molding. A higher Q value indicates better fluidity and better moldability. For molding of a thin-wall molded article such as the light guide plate described above, the Q value is preferably not less than 10, more preferably not less than 15, still more preferably not less than 20, especially preferably not less than 25. On the other hand, the upper limit of the Q value is not limited as long as the excellent physical properties of the aromatic polycarbonate resin of the present invention are not deteriorated. The Q value is usually not more than 80, preferably not more than 70, more preferably not more than 60, still more preferably not more than 50, especially preferably not more than 45.

When the Q value of the aromatic polycarbonate resin of the present invention is controlled to within the range described above, two or more kinds of aromatic polycarbonate resins having different Q values may be mixed. In such a case, the Q value of the aromatic polycarbonate resin of the present invention may be controlled by mixing an aromatic polycarbonate resin having a Q value outside the above-described preferred range.

The Q value is influenced by physical properties such as the types and the ratios of the carbonate structure (A) and the carbonate structure (B) described above and the molecular weight of the aromatic polycarbonate resin. Those skilled in the art can easily obtain an aromatic polycarbonate resin having an arbitrary Q value by controlling these physical properties.

Glass Transition Temperature (Tg) of Aromatic Polycarbonate Resin

The aromatic polycarbonate resin of the present invention has a glass transition temperature (Tg) of 90° C. to 145° C. In cases where the glass transition temperature (Tg) is less than 90° C., the heat resistance of the polycarbonate resin of the present invention is too low, and therefore the resin cannot be applied to optical members such as light guide plates, which is not preferred. On the other hand, in cases where the glass transition temperature (Tg) is higher than 145° C., solidification in the mold during injection molding occurs too fast, and the flow length decreases, leading to a tendency to show poor moldability, which is not preferred. From such a point of view, the glass transition temperature (Tg) of the aromatic polycarbonate resin of the present invention is preferably not less than 95° C., more preferably not less than 100° C., still more preferably not less than 105° C., especially preferably not less than 110° C. On the other hand, the glass transition temperature is preferably not more than 142° C., more preferably not more than 140° C., still more preferably not more than 138° C., especially preferably not more than 135° C.

The glass transition temperature (Tg) of the aromatic polycarbonate resin of the present invention means the extrapolated glass transition starting temperature determined as follows. Using a differential scanning calorimeter (DSC 6220, manufactured by SII), about 10 mg of an aromatic polycarbonate resin sample is heated at a heating rate of 20° C./min. while measuring the amount of heat. According to JIS-K7121, a straight line is drawn by extending the base line in the low-temperature side toward the high-temperature side, and a tangent line is drawn at the point where the slope of the curve becomes maximum in the portion showing the stepwise change due to glass transition. The temperature at the intersection of these lines corresponds to the extrapolated glass transition starting temperature.

The glass transition temperature (Tg) is also influenced by physical properties such as the types and the ratios of the carbonate structure (A) and the carbonate structure (B) described above and the molecular weight of the aromatic polycarbonate resin. Those skilled in the art can easily obtain an aromatic polycarbonate resin having an arbitrary glass transition temperature by controlling these physical properties.

Molecular Weight of Aromatic Polycarbonate Resin

The molecular weight of the aromatic polycarbonate resin of the present invention is not limited as long as the resin satisfies the Q value range described above. The molecular weight is usually 9000 to 24,000 in terms of the viscosity average molecular weight (Mv) as calculated from the solution viscosity. In cases where the viscosity average molecular weight is not more than the lower limit described above, the strength of the aromatic polycarbonate resin of the present invention tends to be insufficient, while in cases where the viscosity average molecular weight is more than the upper limit described above, the fluidity tends to be insufficient, which is not preferred. From such a point of view, the viscosity average molecular weight (Mv) of the aromatic polycarbonate resin composition of the present invention is preferably not less than 10,000, more preferably not less than 11,000, still more preferably not less than 11,500, and preferably not more than 17,500, more preferably not more than 16,000, still more preferably not more than 15,000.

When the viscosity average molecular weight of the aromatic polycarbonate resin of the present invention is controlled to within the range described above, two or more kinds of aromatic polycarbonate resins having different viscosity average molecular weights may be mixed. In such a case, the viscosity average molecular weight (Mv) of the aromatic polycarbonate resin of the present invention may be controlled by mixing an aromatic polycarbonate resin having a viscosity average molecular weight outside the above-described preferred range.

The viscosity average molecular weight (Mv) of the aromatic polycarbonate resin of the present invention means a value calculated by determining the intrinsic viscosity (limiting viscosity) [η] (unit, dL/g) at a temperature of 20° C. using an Ubbelohde viscometer with methylene chloride as a solvent, and applying the determined value to the Schnell's viscosity equation, that is, $\eta = 1.23 \times 10^{-4} \, Mv^{0.83}$ The intrinsic viscosity (limiting viscosity) [η] is a value calculated by measuring the specific viscosity [ηsp] at each solution concentration [C] (g/dL) and applying the measured value to the following equation.

$$\eta = \lim_{c \to 0} \eta_{sp}/c$$

The intrinsic viscosity (dL/g) of the aromatic polycarbonate resin of the present invention is not limited as long as the resin satisfies the Q value range described above. Depending on the viscosity average molecular weight described above, the intrinsic viscosity is usually 0.24 to 0.54, preferably not less than 0.26, more preferably not less than 0.28, still more preferably not less than 0.29, and preferably not more than 0.42, more preferably not more than 0.39, still more preferably not more than 0.37.

Amount of Terminal Hydroxyl Groups in Aromatic Polycarbonate Resin

The amount of terminal hydroxyl groups in the aromatic polycarbonate resin of the present invention is not limited as long as the excellent physical properties of the aromatic polycarbonate resin of the present invention are not deteriorated. The amount of terminal hydroxyl groups is usually 10 to 2000 ppm. The amount of terminal hydroxyl groups in the aromatic polycarbonate resin of the present invention is preferably not less than 20 ppm, more preferably not less than 50 ppm, still more preferably not less than 100 ppm. On the other hand, the amount of terminal hydroxyl groups is preferably not more than 1700 ppm, more preferably not more than 1500 ppm, still more preferably not more than 1200 ppm. In cases where the amount of terminal hydroxyl groups is not less than the lower limit of this range, the hue and the productivity of the aromatic polycarbonate resin and the aromatic polycarbonate resin composition of the present invention can be further improved. In cases where the amount is not more than the upper limit of this range, the thermal stability and the moist heat stability of the aromatic polycarbonate resin and the aromatic polycarbonate resin composition of the present invention can be further improved.

The amount of terminal hydroxyl groups in the aromatic polycarbonate resin of the present invention can be adjusted to within the range described above by an arbitrary known method. For example, in cases where the aromatic polycarbonate resin of the present invention is produced by polycondensation by transesterification reaction, the amount of terminal hydroxyl groups can be adjusted to within the above-described range by adjusting the mixing ratio between the carbonate ester and the dihydroxy compounds, the degree of pressure reduction during the transesterification reaction, and/or the like.

Examples of more positive control methods include a method in which a terminating agent is separately mixed during the reaction. Examples of the terminating agent in this process include monovalent phenols, monovalent carboxylic acids, and diester carbonates. A single type of terminating agent may be used, or two or more types of terminating agents may be used in an arbitrary combination at arbitrary ratios.

In cases where the aromatic polycarbonate resin of the present invention is produced by interfacial polymerization, the amount of terminal hydroxyl groups can be arbitrarily adjusted by adjusting the amount of a molecular weight modifier (terminating agent) included.

The terminal hydroxyl group concentration is represented by the mass, expressed in ppm units, of the terminal hydroxyl groups with respect to the mass of the aromatic polycarbonate resin. For the measurement, colorimetry by the titanium tetrachloride/acetic acid method (the method described in Macromol. Chem. 88 215 (1965)) is used. In an aromatic polycarbonate resin copolymer composed of a plurality of dihydroxy compounds, the corresponding dihydroxy compounds are mixed depending on the copolymerization ratio, and samples with at least three levels of concentrations are provided. A calibration curve is then drawn with the data obtained at the three or more points, and the amount of terminal hydroxyl groups in the aromatic polycarbonate resin copolymer is measured thereafter. The detection wavelength is 546 nm.

Impact Resistances of Aromatic Polycarbonate Resin and Aromatic Polycarbonate Resin Composition In the aromatic polycarbonate resin of the present invention and the later-described aromatic polycarbonate resin composition, the Izod impact value as measured according to ASTM D256 is preferably not less than 15 J/m. In cases where the Izod impact value is less than 15 J/m, when a thin-wall molded article such as a light guide plate is produced, cracking during molding or cracking during handling of the molded article may occur. Moreover, when the molded article is used for preparing a liquid crystal backlight unit, or when it is incorporated into a product, cracking tends to occur, which is not preferred from the viewpoint of the yield and the strength of the product. From such a point of view, the Izod impact value is more preferably not less than 20 J/m, still more preferably not less than 25 J/m, especially preferably not less than 30 J/m, most preferably not less than 35 J/m.

In the aromatic polycarbonate resin of the present invention and the later-described aromatic polycarbonate resin composition, the flow value (Q value) described above is preferably not less than 15 (unit: $10^{-2}$ cm$^3$/sec.), and the Izod impact value as measured according to ASTM D256 is preferably not less than 20 J/m, more preferably not less than 25 J/m, especially preferably not less than 30 J/m, most preferably not less than 35 J/m.

Method for Producing Aromatic Polycarbonate Resin

The aromatic polycarbonate resin of the present invention is obtained by polycondensation of dihydroxy compounds including an aromatic dihydroxy compound necessary for forming the carbonate structural unit (A), an aromatic dihydroxy compound necessary for forming the carbonate structural unit (B), and another dihydroxy compound optionally selected; with a carbonate-forming compound.

Examples of the aromatic dihydroxy compound necessary for forming the carbonate structural unit (A) include the aromatic dihydroxy compounds represented by the following Formula (28).

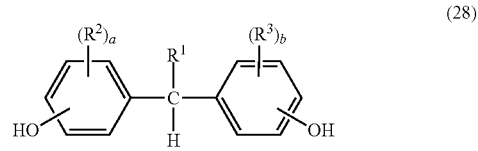

(28)

In Formula (28), the definitions and preferred examples of $R^1$, $R^2$, $R^3$, a, and b are the same as those described for the carbonate structural unit (A) of Formula (1).

Specific examples of the aromatic dihydroxy compound necessary for forming the carbonate structural unit (A) include the aromatic dihydroxy compounds represented by the following Formulae (29) to (31). Among these, the aromatic dihydroxy compounds represented by Formula (29) are more preferred since they tend to increase the thermal stability. However, the aromatic dihydroxy compounds of Formulae (30) and (31) may also be included at arbitrary ratios.

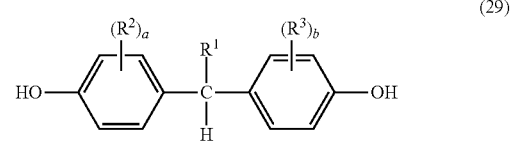

(29)

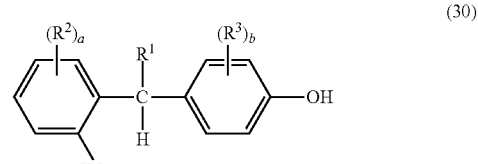

(30)

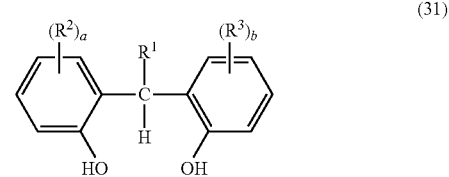

(31)

From such a point of view, more preferred specific examples of the aromatic dihydroxy compound necessary for forming the carbonate structural unit (A) include the following:

1,1-bis(4-hydroxyphenyl)nonane,
1,1-bis(2-hydroxyphenyl)nonane,
1-(2-hydroxyphenyl)-1-(4-hydroxyphenyl)nonane,
1,1-bis(4-hydroxyphenyl)decane,
1,1-bis(2-hydroxyphenyl)decane,
1-(2-hydroxyphenyl)-1-(4-hydroxyphenyl)decane,
1,1-bis(4-hydroxyphenyl)undecane,
1,1-bis(2-hydroxyphenyl)undecane,
1-(2-hydroxyphenyl)-1-(4-hydroxyphenyl)undecane,
1,1-bis(4-hydroxyphenyl)dodecane,
1,1-bis(2-hydroxyphenyl)dodecane,
1-(2-hydroxyphenyl)-1-(4-hydroxyphenyl)dodecane, 1,1-bis(4-hydroxyphenyl)tridecane,
1,1-bis(2-hydroxyphenyl)tridecane,
1-(2-hydroxyphenyl)-1-(4-hydroxyphenyl)tridecane,
1,1-bis(4-hydroxyphenyl)tetradecane,
1,1-bis(2-hydroxyphenyl)tetradecane,
1-(2-hydroxyphenyl)-1-(4-hydroxyphenyl)tetradecane,
1,1-bis(4-hydroxyphenyl)pentadecane,
1,1-bis(2-hydroxyphenyl)pentadecane,
1-(2-hydroxyphenyl)-1-(4-hydroxyphenyl)pentadecane,
1,1-bis(4-hydroxyphenyl)hexadecane,
1,1-bis(2-hydroxyphenyl)hexadecane,
1-(2-hydroxyphenyl)-1-(4-hydroxyphenyl)hexadecane,
1,1-bis(4-hydroxyphenyl)heptadecane,
1,1-bis(2-hydroxyphenyl)heptadecane,
1-(2-hydroxyphenyl)-1-(4-hydroxyphenyl)heptadecane,
1,1-bis(3-methyl-4-hydroxyphenyl)nonane,
1,1-bis(2-hydroxy-3-methylphenyl)nonane,
1-(2-hydroxy-3-methyl-phenyl)-1-(3-methyl-4-hydroxyphenyl)nonane,
1,1-bis(3-methyl-4-hydroxyphenyl)decane,
1,1-bis(2-hydroxy-3-methylphenyl)decane,
1-(2-hydroxy-3-methyl-phenyl)-1-(3-methyl-4-hydroxyphenyl)decane,
1,1-bis(3-methyl-4-hydroxyphenyl)undecane,
1,1-bis(2-hydroxy-3-methylphenyl)undecane,
1-(2-hydroxy-3-methyl-phenyl)-1-(3-methyl-4-hydroxyphenyl)undecane,
1,1-bis(3-methyl-4-hydroxyphenyl)dodecane,
1,1-bis(2-hydroxy-3-methylphenyl)dodecane,
1-(2-hydroxy-3-methyl-phenyl)-1-(3-methyl-4-hydroxyphenyl)dodecane,
1,1-bis(3-methyl-4-hydroxyphenyl)tridecane,
1,1-bis(2-hydroxy-3-methylphenyl)tridecane,
1-(2-hydroxy-3-methyl-phenyl)-1-(3-methyl-4-hydroxyphenyl)tridecane,
1,1-bis(3-methyl-4-hydroxyphenyl)tetradecane,
1,1-bis(2-hydroxy-3-methylphenyl)tetradecane,
1-(2-hydroxy-3-methyl-phenyl)-1-(3-methyl-4-hydroxyphenyl)tetradecane,
1,1-bis(3-methyl-4-hydroxyphenyl)pentadecane,
1,1-bis(2-hydroxy-3-methylphenyl)pentadecane,
1-(2-hydroxy-3-methyl-phenyl)-1-(3-methyl-4-hydroxyphenyl)pentadecane,
1,1-bis(3-methyl-4-hydroxyphenyl)hexadecane,
1,1-bis(2-hydroxy-3-methylphenyl)hexadecane,
1-(2-hydroxy-3-methyl-phenyl)-1-(3-methyl-4-hydroxyphenyl)hexadecane,
1,1-bis(3-methyl-4-hydroxyphenyl)heptadecane,
1,1-bis(2-hydroxy-3-methylphenyl)heptadecane,
1-(2-hydroxy-3-methyl-phenyl)-1-(3-methyl-4-hydroxyphenyl)heptadecane,
1,1-bis(3,5-dimethyl-4-hydroxyphenyl)nonane,
1,1-bis(3,5-dimethyl-4-hydroxyphenyl)decane,
1,1-bis(3,5-dimethyl-4-hydroxyphenyl)undecane,
1,1-bis(3,5-dimethyl-4-hydroxyphenyl)dodecane,
1,1-bis(3,5-dimethyl-4-hydroxyphenyl)tridecane,
1,1-bis(3,5-dimethyl-4-hydroxyphenyl)tetradecane,
1,1-bis(3-ethyl-4-hydroxyphenyl)nonane,
1,1-bis(3-ethyl-4-hydroxyphenyl)decane,
1,1-bis(3-ethyl-4-hydroxyphenyl)undecane,
1,1-bis(3-ethyl-4-hydroxyphenyl)dodecane,
1,1-bis(3-propyl-4-hydroxyphenyl)nonane,
1,1-bis(3-propyl-4-hydroxyphenyl)decane,
1,1-bis(3-propyl-4-hydroxyphenyl)undecane,
1,1-bis(3-propyl-4-hydroxyphenyl)dodecane,
1,1-bis(3-butyl-4-hydroxyphenyl)nonane,
1,1-bis(3-butyl-4-hydroxyphenyl)decane,
1,1-bis(3-butyl-4-hydroxyphenyl)undecane,
1,1-bis(3-butyl-4-hydroxyphenyl)dodecane,
1,1-bis(3-nonyl-4-hydroxyphenyl)nonane,
1,1-bis(3-nonyl-4-hydroxyphenyl)decane,
1,1-bis(3-nonyl-4-hydroxyphenyl)undecane, and
1,1-bis(3-nonyl-4-hydroxyphenyl)dodecane.

From the viewpoint of the thermal stability, hue, and impact strength, the aromatic dihydroxy compound necessary for forming the carbonate structural unit (A) of the aromatic polycarbonate resin of the present invention is more preferably
1,1-bis(4-hydroxyphenyl)nonane,
1,1-bis(4-hydroxyphenyl)decane,
1,1-bis(4-hydroxyphenyl)undecane,
1,1-bis(4-hydroxyphenyl)dodecane,
1,1-bis(4-hydroxyphenyl)tridecane,
1,1-bis(4-hydroxyphenyl)tetradecane,
1,1-bis(4-hydroxyphenyl)pentadecane,
1,1-bis(4-hydroxyphenyl)hexadecane, or
1,1-bis(4-hydroxyphenyl)heptadecane;
still more preferably
1,1-bis(4-hydroxyphenyl)decane,
1,1-bis(4-hydroxyphenyl)undecane,
1,1-bis(4-hydroxyphenyl)dodecane, or
1,1-bis(4-hydroxyphenyl)tridecane;
most preferably
1,1-bis(4-hydroxyphenyl)dodecane.

Specific examples of the aromatic dihydroxy compound necessary for forming the carbonate structural unit (B) include 2,2-bis(4-hydroxyphenyl)propane, 2,2-bis(2-hydroxyphenyl)propane, and 2-(2-hydroxyphenyl)-2-(4-hydroxyphenyl)propane. Among these, from the viewpoint of the thermal stability, hue, and impact strength, 2,2-bis(4-hydroxyphenyl)propane (the so-called bisphenol A) is more preferred.

The other dihydroxy compound, which is different from the aromatic dihydroxy compound necessary for forming the carbonate structural unit (A) and the aromatic dihydroxy compound necessary for forming the carbonate structural unit (B), is not limited, and may be either an aromatic dihydroxy compound having an aromatic ring in the molecular skeleton, or an aliphatic dihydroxy compound having no aromatic ring. Further, the other dihydroxy compound may be a dihydroxy compound in which a hetero atom(s) such as N (nitrogen), S (sulfur), P (phosphorus), and/or Si (silicon), and/or a hetero-bond(s), is/are introduced for giving various properties.

From the viewpoint of the heat resistance, thermal stability, and strength, the other dihydroxy compound preferably used is an aromatic dihydroxy compound. Specific examples of such an aromatic dihydroxy compound include the following:

dihydroxybenzenes such as 1,2-dihydroxybenzene, 1,3-dihydroxybenzene (that is, resorcinol), and 1,4-dihydroxybenzene;

dihydroxybiphenyls such as 2,5-dihydroxybiphenyl, 2,2'-dihydroxybiphenyl, and 4,4'-dihydroxybiphenyl;

dihydroxynaphthalenes such as 2,2'-dihydroxy-1,1'-binaphthyl, 1,2-dihydroxynaphthalene, 1,3-dihydroxynaphthalene, 2,3-dihydroxynaphthalene, 1,6-dihydroxynaphthalene, 2,6-dihydroxynaphthalene, 1,7-dihydroxynaphthalene, and 2,7-dihydroxynaphthalene;

dihydroxydiaryl ethers such as 2,2'-dihydroxydiphenyl ether, 3,3'-dihydroxydiphenyl ether, 4,4'-dihydroxydiphenyl ether, 4,4'-dihydroxy-3,3'-dimethyldiphenyl ether, 1,4-bis(3-hydroxyphenoxy)benzene, and 1,3-bis(4-hydroxyphenoxy)benzene;

bis(hydroxyaryl)alkanes such as
1,1-bis(4-hydroxyphenyl)propane,
2,2-bis(3-methyl-4-hydroxyphenyl)propane,
2,2-bis(3-methoxy-4-hydroxyphenyl)propane,
2-(4-hydroxyphenyl)-2-(3-methoxy-4-hydroxyphenyl)propane,
1,1-bis(3-tert-butyl-4-hydroxyphenyl)propane,
2,2-bis(3,5-dimethyl-4-hydroxyphenyl)propane,
2,2-bis(3-cyclohexyl-4-hydroxyphenyl)propane,
2-(4-hydroxyphenyl)-2-(3-cyclohexyl-4-hydroxyphenyl)propane,
α,α'-bis(4-hydroxyphenyl)-1,4-diisopropylbenzene,
1,3-bis[2-(4-hydroxyphenyl)-2-propyl]benzene,
4,4-dihydroxydiphenylmethane,
bis(4-hydroxyphenyl)cyclohexylmethane,
bis(4-hydroxyphenyl)phenylmethane,
bis(4-hydroxyphenyl) (4-propenylphenyl)methane,
bis(4-hydroxyphenyl)diphenylmethane,
bis(4-hydroxyphenyl)naphthylmethane,
1,1-bis(4-hydroxyphenyl)ethane,
1,1-bis(4-hydroxyphenyl)-1-phenylethane,
1,1-bis(4-hydroxyphenyl)-1-naphthylethane,
1,1-bis(4-hydroxyphenyl)butane,
2,2-bis(4-hydroxyphenyl)butane,
2,2-bis(4-hydroxyphenyl)pentane,
2,2-bis(4-hydroxyphenyl)hexane,
2,2-bis(4-hydroxyphenyl)octane,
2,2-bis(4-hydroxyphenyl)hexane, and
4,4-bis(4-hydroxyphenyl)heptane;
bis(hydroxyaryl)cycloalkanes such as
1,1-bis(4-hydroxyphenyl)cyclopentane,
1,1-bis(4-hydroxyphenyl)cyclohexane,
1,1-bis(4-hydroxyphenyl)-3,3-dimethylcyclohexane,
1,1-bis(4-hydroxyphenyl)-3,4-dimethylcyclohexane,
1,1-bis(4-hydroxyphenyl)-3,5-dimethylcyclohexane,
1,1-bis(4-hydroxyphenyl)-3,3,5-trimethylcyclohexane,
1,1-bis(4-hydroxy-3,5-dimethylphenyl)-3,3,5-trimethylcyclohexane,
1,1-bis(4-hydroxyphenyl)-3-propyl-5-methylcyclohexane,
1,1-bis(4-hydroxyphenyl)-3-tert-butyl-cyclohexane,
1,1-bis(4-hydroxyphenyl)-4-tert-butyl-cyclohexane,
1,1-bis(4-hydroxyphenyl)-3-phenylcyclohexane, and
1,1-bis(4-hydroxyphenyl)-4-phenylcyclohexane;
cardo structure-containing bisphenols such as
9,9-bis(4-hydroxyphenyl)fluorene and
9,9-bis(4-hydroxy-3-methylphenyl)fluorene;
dihydroxydiaryl sulfides such as
4,4'-dihydroxydiphenyl sulfide and
4,4'-dihydroxy-3,3'-dimethyldiphenyl sulfide;
dihydroxydiaryl sulfoxides such as
4,4'-dihydroxydiphenyl sulfoxide and
4,4'-dihydroxy-3,3'-dimethyldiphenyl sulfoxide; and dihydroxydiaryl sulfones
such as 4,4'-dihydroxydiphenyl sulfone and 4,4'-dihydroxy-3,3'-dimethyldiphenyl sulfone.

A single type of aromatic dihydroxy compound may be used, or two or more types of aromatic dihydroxy compounds may be used in an arbitrary combination at arbitrary ratios.

As the other dihydroxy compound described above, the following aliphatic dihydroxy compounds may also be used depending on the purpose. Specific examples of such aliphatic dihydroxy compounds include the following:
alkanediols such as ethane-1,2-diol, propane-1,2-diol, propane-1,3-diol, 2,2-dimethylpropane-1,3-diol, 2-methyl-2-propylpropane-1,3-diol, butane-1,4-diol, pentane-1,5-diol, hexane-1,6-diol, and decane-1,10-diol; cycloalkanediols such as cyclopentane-1,2-diol, cyclohexane-1,2-diol, cyclohexane-1,4-diol, 1,4-cyclohexanedimethanol, 4-(2-hydroxyethyl)cyclohexanol, and 2,2,4,4-tetramethyl-cyclobutane-1,3-diol; glycols such as ethylene glycol, 2,2'-oxydiethanol (that is, diethylene glycol), triethylene glycol, propylene glycol, and spiroglycol;
aralkyldiols such as 1,2-benzenedimethanol, 1,3-benzenedimethanol, 1,4-benzenedimethanol, 1,4-benzenediethanol, 1,3-bis(2-hydroxyethoxy)benzene, 1,4-bis(2-hydroxyethoxy)benzene, 2,3-bis(hydroxymethyl)naphthalene, 1,6-bis(hydroxyethoxy)naphthalene, 4,4'-biphenyldimethanol, 4,4'-biphenyldiethanol, 1,4-bis(2-hydroxyethoxy)biphenyl, bisphenol A bis(2-hydroxyethyl)ether, and bisphenol S bis(2-hydroxyethyl) ether;
cyclic ethers such as 1,2-epoxyethane (that is, ethylene oxide), 1,2-epoxypropane (that is, propylene oxide), 1,2-epoxycyclopentane, 1,2-epoxycyclohexane, 1,4-epoxycyclohexane, 1-methyl-1,2-epoxycyclohexane, 2,3-epoxynorbornane, and 1,3-epoxypropane; and
oxygen-containing heterocyclic dihydroxy compounds such as isosorbide, isomannide, and isoidide.

A single type of aliphatic dihydroxy compound may be used, or two or more types of aliphatic dihydroxy compounds may be used in an arbitrary combination at arbitrary ratios.

Examples of the carbonate-forming compound include carbonyl halides and carbonate esters. A single type of carbonate-forming compound may be used, or two or more types of carbonate-forming compounds may be used in an arbitrary combination at arbitrary ratios.

Specific examples of the carbonyl halides include phosgene; haloformates such as bischloroformate bodies of dihydroxy compounds, and monochloroformate bodies of dihydroxy compounds.

Specific examples of the carbonate esters include the compounds represented by the following Formula (32), for example, aryl carbonates; dialkyl carbonates; biscarbonate bodies of dihydroxy compounds; monocarbonate bodies of dihydroxy compounds; and carbonate bodies of dihydroxy compounds such as cyclic carbonates.

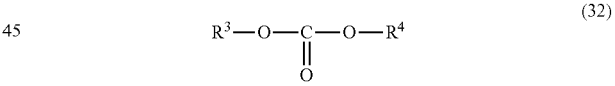

(32)

In Formula (32), $R^3$ and $R^4$ each independently represent $C_1$-$C_{30}$ alkyl, aryl, or arylalkyl. Hereinafter, when $R^3$ and $R^4$ are alky and/or arylalkyl, the carbonate ester may be referred to as dialkyl carbonate, and when $R^3$ and $R^4$ are aryl, the carbonate ester may be referred to as diaryl carbonate. In particular, from the viewpoint of reactivity with the dihydroxy compounds, both $R^3$ and $R^4$ are preferably aryl. The carbonate ester is more preferably a diaryl carbonate represented by the following Formula (33).

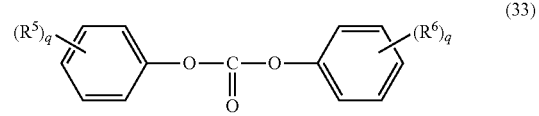

(33)

In Formula (33), $R^5$ and $R^6$ each independently represent a halogen atom, nitro, cyano, $C_1$-$C_{20}$ alkyl, $C_1$-$C_{20}$ alkoxycarbonyl, $C_4$-$C_{20}$ cycloalkyl, or $C_6$-$C_{20}$ aryl, and p and q each independently represent an integer of 0 to 5.

Specific examples of such a carbonate ester include dialkyl carbonates such as dimethyl carbonate, diethyl carbonate, and di-t-butyl carbonate; and (substituted) diaryl carbonates such as diphenyl carbonate (which may be hereinafter referred to as "DPC"), bis(4-methylphenyl)carbonate, bis(4-chlorophenyl)carbonate, bis(4-fluorophenyl)carbonate, bis(2-chlorophenyl)carbonate, bis(2,4-difluorophenyl)carbonate, bis(4-nitrophenyl)carbonate, bis (2-nitrophenyl)carbonate, bis(methylsalicylphenyl)carbonate, and ditolyl carbonate. Among these, diphenyl carbonate is preferred. These carbonate esters may be used individually, or two or more of these may be used as a mixture.

Preferably not more than 50 mol %, more preferably not more than 30 mol % of the carbonate ester may be substituted with a dicarboxylic acid(s) and/or dicarboxylic acid ester(s). Representative examples of the dicarboxylic acid(s) and/or dicarboxylic acid ester(s) include terephthalic acid, isophthalic acid, diphenyl terephthalate, and diphenyl isophthalate. In cases of substitution with such a dicarboxylic acid(s) and/or dicarboxylic acid ester(s), a polyester carbonate is obtained.

The aromatic polycarbonate resin of the present invention can be produced by a conventionally known polymerization method, and the polymerization method is not limited. Examples of the polymerization method include interfacial polymerization, melt transesterification, pyridine method, ring-opening polymerization of cyclic carbonate compounds, and solid-phase transesterification of prepolymers. Preferred methods among these are concretely described below.

Interfacial Polymerization

First, a case where the aromatic polycarbonate resin of the present invention is produced by interfacial polymerization is described. In the interfacial polymerization, the pH is usually maintained at not less than 9 in the presence of an organic solvent inert to the reaction, and an aqueous alkali solution. After reacting the material dihydroxy compounds with the carbonate-forming compound (preferably phosgene), interfacial polymerization is carried out in the presence of a polymerization catalyst to obtain a polycarbonate resin. If necessary, in the reaction system, a molecular weight modifier (terminating agent) may be allowed to be present, and, for prevention of oxidation of the dihydroxy compounds, an antioxidant may be allowed to present.

The material dihydroxy compounds and the carbonate-forming compound are as described above. Among carbonate-forming compounds, phosgene is preferably used. In cases where phosgene is used, the method is specifically called the phosgene method.

Examples of the organic solvent inert to the reaction include, but are not limited to, chlorinated hydrocarbons such as dichloromethane, 1,2-dichloroethane, chloroform, monochlorobenzene, and dichlorobenzene; and aromatic hydrocarbons such as benzene, toluene, and xylene. A single type of organic solvent may be used, or two or more types of organic solvents may be used in an arbitrary combination at arbitrary ratios.

Examples of the alkali compound contained in the aqueous alkali solution include, but are not limited to, alkali metal compounds such as sodium hydroxide, potassium hydroxide, lithium hydroxide, and sodium hydrogen carbonate; and alkaline earth metal compounds. Sodium hydroxide and potassium hydroxide are especially preferred. A single type of alkali compound may be used, or two or more types of alkali compounds may be used in an arbitrary combination at arbitrary ratios.

The concentration of the alkali compound in the aqueous alkali solution is not limited. The alkali compound is usually used in an amount of 5 to 10% by mass for the purpose of controlling the pH of the aqueous alkali solution to 10 to 12 for the reaction. In cases where phosgene is blown, for controlling the pH of the aqueous phase to 10 to 12, preferably 10 to 11, the molar ratio between the material dihydroxy compounds and the alkali compound is preferably adjusted to usually 1:1.9 or more, especially 1:2.0 or more, and usually 1:3.2 or less, especially 1:2.5 or less.

Examples of the polymerization catalyst include, but are not limited to, aliphatic tertiary amines such as trimethylamine, triethylamine, tributylamine, tripropylamine, and trihexylamine; alicyclic tertiary amines such as N,N'-dimethylcyclohexylamine and N,N'-diethylcyclohexylamine; aromatic tertiary amines such as N,N'-dimethylaniline and N,N'-diethylaniline; quaternary ammonium salts such as trimethylbenzylammonium chloride, tetramethylammonium chloride, and triethylbenzylammonium chloride; pyridine; guanine; and salts of guanidine. A single type of polymerization catalyst may be used, or two or more types of polymerization catalysts may be used in an arbitrary combination at arbitrary ratios.

Examples of the molecular weight modifier include, but are not limited to, aromatic phenols having a monohydric phenolic hydroxyl group; aliphatic alcohols such as methanol and butanol; mercaptan; and phthalic imide. Aromatic phenols are especially preferred. Specific examples of such aromatic phenols include phenol, o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, p-t-octylphenol, o-cyclohexylphenol, m-cyclohexylphenol, p-cyclohexylphenol, o-phenylphenol, m-phenylphenol, p-phenylphenol, o-n-nonylphenol, m-nonylphenol, p-n-nonylphenol, o-cumylphenol, m-cumylphenol, p-cumylphenol, o-naphthylphenol, m-naphthylphenol, and p-naphthylphenol; 2,5-di-t-butylphenol; 2,4-di-t-butylphenol; 3,5-di-t-butylphenol; 2,5-dicumylphenol; 3,5-dicumylphenol; p-cresol, bromophenol, tribromophenol, and monoalkylphenols having a linear or branched alkyl group having an average carbon number of 12 to 35 at the ortho position, meta position, or para position; 9-(4-hydroxyphenyl)-9-(4-methoxyphenyl)fluorene; 9-(4-hydroxy-3-methylphenyl)-9-(4-methoxy-3-methylphenyl)fluorene; and 4-(1-adamantyl)phenol. Among these, p-t-butyl phenol, p-phenylphenol, and p-cumylphenol are preferably used. A single type of molecular weight modifier may be used, or two or more types of molecular weight modifiers may be used in an arbitrary combination at arbitrary ratios.

The amount of the molecular weight modifier used is not limited. For example, the amount is usually not less than 0.5 mole, preferably not less than 1 mole, and usually not more than 50 moles, preferably not more than 30 moles, with respect to 100 moles of the material dihydroxy compounds. In cases where the amount of the molecular weight modifier used is within this range, thermal stability and hydrolysis resistance of the aromatic polycarbonate resin can be increased.

In the reaction, a reaction substrate(s) (reaction material(s)), reaction medium/media (organic solvent(s)), catalyst(s), additive(s), and/or the like may be mixed in an arbitrary order as long as a desired aromatic polycarbonate resin can be obtained. An appropriate order may be arbitrarily set. For example, in cases where phosgene is used as the carbonate-forming compound, a molecular weight modifier may be mixed at an arbitrary timing between the reaction of the material dihydroxy compounds with phosgene (phosgenation) and the beginning of the polymerization reaction.

The reaction temperature is not limited, and usually 0 to 40° C. The reaction time is not limited, and usually several minutes (for example, 10 minutes) to several hours (for example, 6 hours).

Melt Transesterification

A case where the aromatic polycarbonate resin of the present invention is produced by melt transesterification is described below. In the melt transesterification, transesterification reaction between, for example, a carbonate ester and the material dihydroxy compounds is performed.

The material dihydroxy compounds and the carbonate ester are as described above.

The ratio between the material dihydroxy compounds and the carbonate ester (including the substituted dicarboxylic acid or dicarboxylic acid ester; the same applies hereinafter) is arbitrary as long as a desired polycarbonate resin can be obtained. In the polymerization with the dihydroxy compounds, the carbonate ester is preferably used in an excess amount to the material dihydroxy compounds. That is, the amount of the carbonate ester is preferably 1.01 to 1.30 times the amount (molar ratio), more preferably 1.02 to 1.20 times the amount (molar ratio) of the dihydroxy compounds. In cases where the molar ratio is too low, the amount of terminal OH groups in the resulting polycarbonate resin is large, and the thermal stability of the resin tends to be poor. In cases where the molar ratio is too high, the reaction rate in the transesterification is low, so that production of a polycarbonate resin having a desired molecular weight may be difficult, or a large amount of the carbonate ester remains in the resin, resulting in generation of odor during molding or after production of a molded article in some cases.

Usually, in cases where the aromatic polycarbonate resin is produced by melt transesterification, a transesterification catalyst is used. The transesterification catalyst is not limited, and a conventionally known transesterification catalyst may be used. For example, an alkali metal compound(s) and/or an alkaline earth metal compound(s) is/are preferably used. In addition, a basic compound(s) such as a basic boron compound(s), basic phosphorus compound(s), basic ammonium compound(s), and/or amine compound(s) may be supplementarily used in combination. A single type of transesterification catalyst may be used, or two or more types of transesterification catalysts may be used in an arbitrary combination at arbitrary ratios.

In the melt transesterification, the reaction temperature is not limited, and usually 100 to 320° C. The pressure during the reaction is also not limited. The reaction is usually carried out under a reduced pressure of not more than 2 mmHg. More specifically, the operation may be carried out by allowing melt polycondensation reaction to proceed under the above conditions while removing by-products.

In terms of the reaction mode, the reaction may be carried out by either a batch method or a continuous method. In cases where the reaction is carried out by a batch method, a reaction substrate(s), reaction medium/media, catalyst(s), additive(s), and/or the like may be mixed in an arbitrary order as long as a desired aromatic polycarbonate resin can be obtained. An appropriate order may be arbitrarily set. However, taking into account the stability and the like of the aromatic polycarbonate resin, the melt polycondensation reaction is preferably carried out by a continuous method.

In the melt transesterification, a catalyst deactivator may be used, if necessary. As the catalyst deactivator, a compound that neutralizes the transesterification catalyst may be arbitrarily used. Examples of the catalyst deactivator include sulfur-containing acidic compounds and derivatives thereof, and phosphorus acidic compounds and derivatives thereof. A single type of catalyst deactivator may be used, or two or more types of catalyst deactivators may be used in an arbitrary combination at arbitrary ratios.

The amount of the catalyst deactivator used is not limited, and usually not less than 0.5 equivalent, preferably not less than 1 equivalent, and usually not more than 10 equivalents, preferably not more than 8 equivalents, with respect to the alkali metal or alkaline earth metal contained in the transesterification catalyst. Further, the amount of the catalyst deactivator is usually not less than 1 ppm, and usually not more than 100 ppm, preferably not more than 50 ppm, with respect to the aromatic polycarbonate resin.

Aromatic Polycarbonate Resin Compositions

The aromatic polycarbonate resin composition of the present invention is a mixture of the polycarbonate resin of the present invention and a known additive(s). As the additive, any known additive may be used without limitation as long as the excellent physical properties of the aromatic polycarbonate resin of the present invention are not deteriorated. The composition may be obtained by inclusion of, in particular, at least one selected from the group consisting of heat stabilizers, antioxidants, ultraviolet absorbers, brightness improvers, dyes, pigments, and mold release agents.

Heat Stabilizer

The heat stabilizer used in the aromatic polycarbonate resin composition of the present invention is not limited as long as it is a known heat stabilizer that has conventionally been added to thermoplastic resins, and examples of the heat stabilizer include phosphorus-based heat stabilizers and sulfur-based heat stabilizers. In particular, phosphorus-based stabilizers are preferred since they tend to allow production of an aromatic polycarbonate resin of the present invention having a better initial hue and a better residence heat stability.

Specific examples of the phosphorus-based heat stabilizers include oxoacids of phosphorus such as phosphoric acid, phosphoric acid, phosphorous acid, phosphinic acid, and polyphosphoric acid; metal salts of acid pyrophosphoric acid such as sodium acid pyrophosphate, potassium acid pyrophosphate, and calcium acid pyrophosphate; phosphoric acid salts of Group 1 or Group 2B metals such as potassium phosphate, sodium phosphate, cesium phosphate, and zinc phosphate; organic phosphate compounds; organic phosphite compounds; and organic phosphonite compounds. From the viewpoint of thermal stability and moist heat stability, organic phosphite compounds and organic phosphonite are especially preferred, and organic phosphite compounds are most preferred.

Examples of the organic phosphite compounds include triphenylphosphite, tris(4-methylphenyl)phosphite, tris(4-t-butylphenyl)phosphite, tris(monononylphenyl)phosphite, tris(2-methyl-4-ethylphenyl)phosphite, tris(2-methyl-4-t-butylphenyl)phosphite, tris(2,4-di-t-butylphenyl)phosphite, tris(2,6-di-t-butylphenyl)phosphite, tris(2,4-di-t-butyl-5-methylphenyl)phosphite, tris(mono,dinonylphenyl)phosphite, bis(monononylphenyl)pentaerythritol-di-phosphite, bis(2,4-di-t-butylphenyl)pentaerythritol-di-phosphite, bis(2,6-di-t-butyl-4-methylphenyl)pentaerythritol-di-phosphite, bis(2,4,6-tri-t-butylphenyl)pentaerythritol-di-phosphite, bis(2,4-di-t-butyl-5-methylphenyl)pentaerythritol-di-phosphite, (2,6-di-t-butyl-4methylphenyl)pentaerythritol diphosphite, 2,2-methylenebis(4,6-dimethylphenyl)octylphosphite, 2,2-methylenebis(4-t-butyl-6-methylphenyl)octylphosphite, 2,2-methylenebis(4,6-di-t-butylphenyl)octylphosphite, 2,2-methylenebis(4,6-dimethylphenyl)hexylphosphite, 2,2-methylenebis(4,6-di-t-butylphenyl)hexylphosphite, and 2,2-methylenebis(4,6-di-t-butylphenyl)stearyl phosphite. Examples of the organic phosphorite compounds include tetrakis(2,4-di-t-butylphenyl) 4,4'-biphenylene diphosphonite and tetrakis(2,4-di-t-butyl-5-methylphenyl) 4,4'-biphenylene diphosphonite.

Specific examples of such organic phosphite compounds include "Adekastab 1178", "Adekastab (registered trademark) 2112", "Adekastab PEP-8", "Adekastab PEP-36", and "Adekastab HP-10", manufactured by ADEKA Corporation; "JP-351", "JP-360", and "JP-3CP", manufactured by Johoku Chemical Co., Ltd.; and "Irgafos (registered trademark) 168", manufactured by BASF. Examples of the organic phosphonite compounds include "Irgafos P-EPQ", manufactured by BASF.

A single type of phosphorus-based stabilizer may be included, or two or more types of phosphorus-based stabilizers may be included in an arbitrary combination at arbitrary ratios.

The content of the phosphorus-based stabilizer is not limited, and usually not less than 0.001 part by mass, preferably not less than 0.01 part by mass, more preferably not less than 0.03 part by mass, and usually not more than 1 part by mass, preferably not more than 0.7 part by mass, more preferably not more than 0.5 part by mass, with respect to 100 parts by mass of the aromatic polycarbonate resin. In cases where the content of the phosphorus-based stabilizer is less than the lower limit of this range, the thermal stability effect may be insufficient, while in cases where the content of the phosphorus-based stabilizer exceeds the upper limit of this range, the moist heat stability may be low, and generation of gas tends to occur during injection molding.

Antioxidant

The aromatic polycarbonate resin composition of the present invention also preferably contains an antioxidant. The antioxidant used in the aromatic polycarbonate resin composition of the present invention is not limited as long as it is a known antioxidant that has conventionally been added to thermoplastic resins, and examples of the antioxidant include hindered phenol antioxidants. Specific examples of the hindered phenol antioxidants include pentaerythritol tetrakis[3-(3,5-di-tert-butyl-4-hydroxyphenyl)propionate], octadecyl-3-(3,5-di-tert-butyl-4-hydroxyphenyl)propionate, thiodiethylene bis[3-(3,5-di-tert-butyl-4-hydroxyphenyl)propionate], N,N'-hexane-1,6-diylbis[3-(3,5-di-tert-butyl-4-hydroxyphenylpropionamide), 2,4-dimethyl-6-(1-methylpentadecyl)phenol, diethyl[[3,5-bis(1,1-dimethylethyl)-4-hydroxyphenyl]methyl]phosphonate, 3,3',3'',5,5',5''-hexa-tert-butyl-a,a',a''-(mesitylene-2,4,6-triyl)tri-p-cresol, 4,6-bis(octylthiomethyl)-o-cresol, ethylenebis(oxyethylene)bis[3-(5-tert-butyl-4-hydroxy-m-tolyl)propionate], hexamethylene bis[3-(3,5-di-tert-butyl-4-hydroxyphenyl)propionate], 1,3,5-tris(3,5-di-tert-butyl-4-hydroxybenzyl)-1,3,5-triazine-2,4,6(1H,3H,5H)-trione, 2,6-di-tert-butyl-4-(4,6-bis(octylthio)-1,3,5-triazin-2-ylamino)phenol, and 2-[1-(2-hydroxy-3,5-di-tert-pentylphenyl)ethyl]-4,6-di-tert-pentylphenyl acrylate.

Among these, pentaerythritol tetrakis[3-(3,5-di-tert-butyl-4-hydroxyphenyl)propionate] and octadecyl-3-(3,5-di-tert-butyl-4-hydroxyphenyl)propionate are preferred. Specific examples of such phenolic antioxidants include "Irganox 1010" and "Irganox 1076", manufactured by Ciba Specialty Chemicals; and "Adekastab AO-50" and "Adekastab AO-60", manufactured by ADEKA Corporation.

A single type of antioxidant may be included, or two or more types of antioxidants may be included in an arbitrary combination at arbitrary ratios.

The content of the antioxidant is not limited, and usually not less than 0.001 part by mass, preferably not less than 0.01 part by mass, more preferably not less than 0.1 part by mass, and usually not more than 1 part by mass, preferably not more than 0.5 part by mass, with respect to 100 parts by mass of the aromatic polycarbonate resin. In cases where the content of the antioxidant is less than the lower limit of this range, its effect as an antioxidant may be insufficient, while in cases where the content of the phenolic stabilizer exceeds the upper limit of this range, generation of gas may tend to occur during injection molding.

Ultraviolet Absorber

Examples of the ultraviolet absorbers include inorganic ultraviolet absorbers such as cerium oxide and zinc oxide; and organic ultraviolet absorbers such as benzotriazole compounds, benzophenone compounds, salicylate compounds, cyanoacrylate compounds, triazine compounds, oxanilide compounds, malonate compounds, and hindered amine compounds. Among these, organic ultraviolet absorbers are preferred. Benzotriazole compounds are more preferred. By selection of an organic ultraviolet absorber, the aromatic polycarbonate resin composition of the present invention can have favorable transparency and mechanical properties.

Specific examples of the benzotriazole compounds include 2-(2'-hydroxy-5'-methylphenyl)benzotriazole, 2-[2'-hydroxy-3',5'-bis(α,α-dimethylbenzyl)phenyl]-benzotriazole, 2-(2'-hydroxy-3',5'-di-tert-butyl-phenyl)-benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole), 2-(2'-hydroxy-3',5'-di-tert-amyl)-benzotriazole, 2-(2'-hydroxy-5'-tert-octylphenyl)benzotriazole, and 2,2'-methylenebis[4-(1,1,3,3-tetramethylbutyl)-6-(2N-benzotriazol-2-yl)phenol]. Among these, 2-(2'-hydroxy-5'-tert-octylphenyl)benzotriazole and 2,2'-methylenebis[4-(1,1,3,3-tetramethylbutyl)-6-(2N-benzotriazol-2-yl)phenol] are preferred. 2-(2'-Hydroxy-5'-tert-octylphenyl)benzotriazole is especially preferred.

Examples of commercially available products of such benzotriazole compounds include "Seesorb 701", "Seesorb 705", "Seesorb 703", "Seesorb 702", "Seesorb 704", and "Seesorb 709", manufactured by Shipro Kasei Kaisha, Ltd.; "Biosorb 520", "Biosorb 582", "Biosorb 580", and "Biosorb 583", manufactured by Kyodo Chemical Co., Ltd.; "Kemisorb 71" and "Kemisorb 72", manufactured by Chemipro Kasei Kaisha, Ltd.; "Cyasorb UV5411", manufactured by Cytec Industries Inc.; "LA-32", "LA-38", "LA-36", "LA-34", and "LA-31", manufactured by ADEKA Corporation; and "Tinuvin P", "Tinuvin 234", "Tinuvin 326", "Tinuvin 327", and "Tinuvin 328", manufactured by Ciba Specialty Chemicals.

Specific examples of the benzophenone compounds include 2,4-dihydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-n-dodecyloxybenzophenone, bis(5-benzoyl-4-hydroxy-2-methoxyphenyl)methane, 2,2'-dihydroxy-4-methoxybenzophenone, and 2,2'-dihydroxy-4,4'-dimethoxybenzophenone.

Examples of commercially available products of such benzophenone compounds include "Seesorb 100", "Seesorb 101", "Seesorb 101S", "Seesorb 102", and "Seesorb 103", manufactured by Shipro Kasei Kaisha, Ltd.; "Biosorb 100", "Biosorb 110", and "Biosorb 130", manufactured by Kyodo Chemical Co., Ltd.; "Kemisorb 10", "Kemisorb 11", "Kemisorb 11S", "Kemisorb 12", "Kemisorb 13", and "Kemisorb 111", manufactured by Chemipro Kasei Kaisha, Ltd.; "Uvinul 400", manufactured by BASF; "Uvinul M-40", manufactured by BASF; "Uvinul MS-40", manufactured by BASF; "Cyasorb UV9", "Cyasorb UV284", "Cyasorb UV531", and "Cyasorb UV24", manufactured by Cytec Industries Inc.; and "Adekastab 1413" and "Adekastab LA-51", manufactured by ADEKA Corporation.

Specific examples of the salicylate compounds include phenyl salicylate and 4-tert-butylphenyl salicylate. Examples of commercially available products of such salicylate compounds include "Seesorb 201" and "Seesorb 202", manufactured by Shipro Kasei Kaisha, Ltd.; and "Kemisorb 21" and "Kemisorb 22", manufactured by Chemipro Kasei Kaisha, Ltd.

Specific examples of the cyanoacrylate compounds include ethyl-2-cyano-3,3-diphenylacrylate and 2-ethylhexyl-2-cyano-3,3-diphenylacrylate. Examples of commercially available products of such cyanoacrylate compounds include "Seesorb 501", manufactured by Shipro Kasei Kaisha, Ltd.; "Biosorb 910", manufactured by Kyodo Chemical Co., Ltd.; "Uvisolator 300", manufactured by Daiichi Kasei Co., Ltd.; and "Uvinul N-35" and "Uvinul N-539", manufactured by BASF.

Examples of the triazine compounds include compounds having a 1,3,5-triazine skeleton. Specific examples of such triazine compounds include "LA-46", manufactured by ADEKA Corporation; and "Tinuvin 1577ED", "Tinuvin 400", "Tinuvin 405", "Tinuvin 460", "Tinuvin 477-DW", and "Tinuvin 479", manufactured by Ciba Specialty Chemicals.

Specific examples of the oxanilide compounds include 2-ethoxy-2'-ethyloxalinic acid bisanilide. Examples of commercially available products of such oxanilide compounds include "Sanduvor VSU", manufactured by Clariant.

As the malonate compounds, 2-(alkylidene) malonates are preferred. 2-(1-Arylalkylidene) malonates are more preferred. Examples of commercially available products of such malonate compounds include "PR-25", manufactured by Clariant Japan K.K.; and "B-CAP", manufactured by Ciba Specialty Chemicals.

The content of the ultraviolet absorber in the aromatic polycarbonate resin composition of the present invention is usually not less than 0.01 part by mass, preferably not less than 0.1 part by mass, and usually not more than 3 parts by mass, preferably not more than 1 part by mass, with respect to 100 parts by mass of the aromatic polycarbonate resin. In cases where the content of the ultraviolet absorber is less than the lower limit of this range, the weatherability-improving effect may be insufficient, while in cases where the content of the ultraviolet absorber exceeds the upper limit of this range, mold deposits and the like may be produced to cause mold contamination. A single type of ultraviolet absorber may be included, or two or more types of ultraviolet absorbers may be included in an arbitrary combination at arbitrary ratios.

Brightness Improver

The aromatic polycarbonate resin composition of the present invention also preferably contains a brightness improver. The brightness improver used in the aromatic polycarbonate resin composition of the present invention is not limited as long as it is a known brightness improver that has conventionally been added to thermoplastic resins, and preferred examples of the brightness improver include polyalkylene glycols and fatty acid esters thereof, alicyclic epoxy compounds, low molecular weight acrylic resins, low molecular weight styrene resins, and terpene resins.

Examples of the polyalkylene glycols include homopolymers and copolymers of alkylene glycols, and derivatives thereof. Specific examples of the polyalkylene glycols include $C_2$-$C_6$ polyalkylene glycols such as polyethylene glycol, polypropylene glycol, and polytetramethylene glycol; random or block copolymers of polyoxyethylene-polyoxypropylene; and copolymers such as glyceryl ethers of polyoxyethylene-polyoxypropylene, and monobutyl ethers of polyoxyethylene-polyoxypropylene.

Among these, polymers containing an oxyethylene unit, for example, polyethylene glycol, polypropylene glycol, polyoxyethylene-polyoxypropylene copolymers, and derivatives thereof are preferred.

The number average molecular weight of the polyalkylene glycol is usually 500 to 500,000, preferably 1000 to 100,000, more preferably 1000 to 50,000.

As the fatty acid ester of the polyalkylene glycol fatty acid ester, either a linear or branched fatty acid ester may be used. The fatty acid constituting the fatty acid ester may be either a saturated fatty acid or an unsaturated fatty acid. Fatty acid esters in which a part of the hydrogen atoms are substituted with a substituent(s) such as hydroxyl may also be used.

Examples of the fatty acid constituting the fatty acid ester include monovalent or divalent fatty acids having a carbon number of not less than 10, for example, monovalent saturated fatty acids such as capric acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid, and lacceric acid; monovalent unsaturated fatty acids having a carbon number of not less than 10 such as unsaturated fatty acids including oleic acid, elaidic acid, linoleic acid, linolenic acid, arachidonic acid, cetoleic acid, and erucic acid; and divalent fatty acids having a carbon number of not less than 10 such as sebacic acid, undecanedioic acid, dodecanedioic acid, tetradecanedioic acid, thapsic acid and decenedioic acid, undecenedioic acid, and dodecenedioic acid. These fatty acids may be used individually, or as a combination of two or more thereof. Examples of the fatty acid also include fatty acids having one or more hydroxyl groups in the molecule.

Preferred specific examples of the polyalkylene glycol fatty acid ester include polyethylene glycol monopalmitate, polyethylene glycol dipalmitate, polyethylene glycol monostearate, polyethylene glycol distearate, polyethylene glycol (monopalmitate-monostearate), polypropylene glycol monopalmitate, polypropylene glycol dipalmitate, polypropylene glycol monostearate, polypropylene glycol distearate, and polypropylene glycol (monopalmitate-monostearate).

The content of the brightness improver is not limited, and preferably 0.01 to 1 part by mass with respect to 100 parts by mass of the aromatic polycarbonate resin of the present invention. The content is more preferably not less than 0.02 part by mass, still more preferably not less than 0.03 part by mass, and especially not more than 0.9 part by mass, more preferably not more than 0.8 part by mass, still more preferably not more than 0.7 part by mass, especially not more than 0.6 part by mass. In cases where the content of the brightness improver is less than the lower limit of this range, improvement of the hue and suppression of yellowing may be insufficient, while in cases where the content exceeds the upper limit of this range, the color tone may be poor, and the light transmittance may be low.

Dye/Pigment

Examples of the dyes and pigments include inorganic pigments, organic pigments, and organic dyes. Among these, organic pigments and organic dyes are preferred for maintenance of high transparency of the aromatic polycarbonate resin of the present invention.

Examples of the inorganic pigments include carbon black; sulfide-based pigments such as cadmium red and cadmium yellow; silicate-based pigments such as ultramarine blue; oxide-based pigments such as titanium oxide, zinc white, red iron oxide, chromium oxide, iron black, titan yellow, zinc-iron-based brown, titanium-cobalt-based green, cobalt green, cobalt blue, copper-chromium-based black, and copper-iron-based black; chromic acid-based pigments such as chrome yellow and molybdate orange; and ferrocyanide-based pigments such as Prussian blue.

Examples of the organic pigments and the organic dyes include phthalocyanine-based dyes and pigments such as copper phthalocyanine blue and copper phthalocyanine green; azo-based dyes and pigments such as nickel azo yellow; condensed polycyclic dyes and pigments such as thioindigo-based, perinone-based, perylene-based, quinacridone-based, dioxazine-based, isoindolinone-based, and quinophthalone-based dyes and pigments; and anthraquinone-based, heterocycle-based, and methyl-based dyes and pigments.

Among these, from the viewpoint of thermal stability, titanium oxide; carbon black; cyanine-based, quinoline-based, anthraquinone-based, and phthalocyanine-based compounds; and the like are preferred.

A single type of dye/pigment may be included, or two or more types of dye(s)/pigment(s) may be included in an arbitrary combination at arbitrary ratios. For the purposes of ease of handling during the extrusion, and improvement of dispersibility in the resin composition, the dye/pigment may be prepared as a masterbatch with a polystyrene resin, polycarbonate resin, or acrylic resin.

The content of the dye/pigment in the aromatic polycarbonate resin composition of the present invention is usually not more than 5 parts by mass, preferably not more than 3 parts by mass, more preferably not more than 2 parts by mass, with respect to 100 parts by mass of the aromatic polycarbonate resin. In cases where the content of the dye/pigment is too large, the impact resistance may be insufficient.

Mold Release Agent

The aromatic polycarbonate resin composition of the present invention also preferably contains a mold release agent. The mold release agent used in the aromatic polycarbonate resin composition of the present invention is not limited as long as it is a known mold release agent that has conventionally been added to thermoplastic resins, and examples of the mold release agent include aliphatic carboxylic acids; esters of an aliphatic carboxylic acid and an alcohol; aliphatic hydrocarbon compounds having a number average molecular weight of 200 to 15,000; and polysiloxane-based silicone oils.

Examples of the aliphatic carboxylic acids include saturated or unsaturated, aliphatic monovalent, divalent, or trivalent carboxylic acids. The aliphatic carboxylic acids also include alicyclic carboxylic acids. Among these aliphatic carboxylic acids, $C_6$-$C_{36}$ monovalent or divalent carboxylic acids are preferred. $C_6$-$C_{36}$ aliphatic saturated monovalent carboxylic acids are more preferred. Specific examples of such aliphatic carboxylic acids include palmitic acid, stearic acid, caproic acid, capric acid, lauric acid, arachic acid, behenic acid, lignoceric acid, cerotic acid, melissic acid, tetratriacontanoic acid, montanic acid, adipic acid, and azelaic acid.

Examples of the aliphatic carboxylic acid in the esters of an aliphatic carboxylic acid and an alcohol include the same aliphatic carboxylic acids as described above. On the other hand, examples of the alcohol include saturated or unsaturated, monohydric or polyhydric alcohols. Each of these alcohols may have a substituent such as a fluorine atom or an aryl group. Among these, monohydric or polyhydric, saturated alcohols having a carbon number of not more than 30 are preferred. Aliphatic saturated monohydric alcohols and aliphatic saturated polyhydric alcohols having a carbon number of not more than 30 are more preferred. The term "aliphatic" herein is used as a term also including alicyclic compounds.

Specific examples of such alcohols include octanol, decanol, dodecanol, stearyl alcohol, behenyl alcohol, ethylene glycol, diethylene glycol, glycerin, pentaerythritol, 2,2-dihydroxyperfluoropropanol, neopentylene glycol, ditrimethylolpropane, and dipentaerythritol.

Each of the above esters may contain an aliphatic carboxylic acid and/or alcohol as an impurity/impurities. Each of the above esters may be either a pure substance or a mixture of a plurality of compounds. Each of the aliphatic carboxylic acid and the alcohol bound to each other to constitute one ester may be of a single type, or two or more types thereof may be used in an arbitrary combination at arbitrary ratios.

Specific examples of the ester of the aliphatic carboxylic acid and the alcohol include bees waxes (mixtures containing myricyl palmitate as a major component), stearyl stearate, behenyl behenate, stearyl behenate, glycerin monopalmitate, glycerin monostearate, glycerin distearate, glycerin tristearate, pentaerythritol monopalmitate, pentaerythritol monostearate, pentaerythritol distearate, pentaerythritol tristearate, and pentaerythritol tetrastearate.

Examples of the aliphatic hydrocarbons having a number average molecular weight of 200 to 15,000 include liquid paraffins, paraffin waxes, microwaxes, polyethylene waxes, Fischer-Tropsch waxes, and α-olefin oligomers having a carbon number of 3 to 12. The aliphatic hydrocarbons also include alicyclic hydrocarbons. Each of these hydrocarbons may be partially oxidized.

Among these, paraffin waxes, polyethylene waxes, and partially oxidized polyethylene waxes are preferred. Paraffin waxes and polyethylene waxes are more preferred.

The number average molecular weight of the aliphatic hydrocarbon is preferably not more than 5000.

The aliphatic hydrocarbon may be a single substance, or may be a mixture of various constituents having different molecular weights as long as the major component is contained within the above-described range.

Examples of the polysiloxane-based silicone oils include dimethyl silicone oils, methylphenyl silicone oils, diphenyl silicone oils, and fluorinated alkyl silicone oils.

A single type of mold release agent described above may be included, or two or more types of mold release agents described above may be included in an arbitrary combination at arbitrary ratios.

The content of the mold release agent is not limited, and usually not less than 0.001 part by mass, preferably not less than 0.01 part by mass, and usually not more than 2 parts by mass, preferably not more than 1 part by mass, with respect to 100 parts by mass of the aromatic polycarbonate resin. In cases where the content of the mold release agent is less than the lower limit of this range, the mold-releasing effect may be insufficient, while in cases where the content of the mold release agent exceeds the upper limit of this range, a decrease in the hydrolysis resistance, mold contamination during injection molding, and the like may occur.

Other Components

The aromatic polycarbonate resin composition of the present invention may contain another component in addition to the components described above as long as the effect of the present invention and the desired physical properties are not remarkably inhibited. Preferred examples of the other component include polycarbonate resins other than the aromatic polycarbonate resin of the present invention; resins other than polycarbonate resins; and various resin additives. More preferred examples of the other component include polycarbonate resins other than the aromatic polycarbonate resin of the present invention. As the other component, a single type of component may be included, or two or more types of components may be included in an arbitrary combination at arbitrary ratios.

A polycarbonate resin other than the aromatic polycarbonate resin of the present invention may be arbitrarily selected from the polycarbonate resins derived from dihydroxy compounds exemplified above. In particular, aromatic polycarbonate resins are preferred. Bisphenol A-type aromatic polycarbonate resins are more preferred. In cases where a polycarbonate resin other than the aromatic polycarbonate resin of the present invention is contained, its content is preferably not more than 50% by mass, more preferably not more than 40% by mass, still more preferably not more than 30% by mass, especially preferably not more than 20° by mass, with respect to a total of 100% by mass of the aromatic polycarbonate resin and the polycarbonate resin other than the aromatic polycarbonate resin of the present invention. In cases where the other resin is used in an amount larger than this range, the fluidity, transparency, and mechanical properties may be low.

Examples of the other resin include acrylic resins such as polymethyl methacrylate and phenyl methacrylate-methyl methacrylate copolymers; thermoplastic polyester resins such as polyethylene terephthalate resins, polytrimethylene terephthalate, polybutylene terephthalate resins, and polycaprolactone resins; styrene resins such as polystyrene resins, maleic anhydride-modified polystyrene resins, high-impact polystyrene resins (HIPS), acrylonitrile-styrene copolymers (AS resins), acrylonitrile-styrene-acrylic rubber copolymers (ASA resins), and acrylonitrile-ethylene/propylene rubber-styrene copolymers (AES resins); polyolefin resins such as polyethylene resins and polypropylene resins; and terpene resins.

In cases where a resin other than a polycarbonate resin is contained, its content is preferably not more than 40% by mass, more preferably not more than 30% by mass, still more preferably not more than 20° by mass, especially preferably not more than 10% by mass, with respect to a total of 100% by mass of the aromatic polycarbonate resin and the resin other than a polycarbonate resin, although the content is not limited. In cases where the other resin is used in an amount larger than this range, the impact resistance, bending strength, and transparency may be low.

Examples of the resin additives include flame retardants, dyes and pigments, antistatic agents, anti-clouding agents, lubricants, anti-blocking agents, dispersants, and antimicrobial agents. A single type of resin additive may be included, or two or more types of resin additives may be included in an arbitrary combination at arbitrary ratios.

Method for Producing Aromatic Polycarbonate Resin Composition

The method for producing the aromatic polycarbonate resin composition of the present invention is not limited, and known methods for production of polycarbonate resin compositions may be widely employed.

Specific examples of the method include methods in which the aromatic polycarbonate resin and another/other component(s) to be blended as required are preliminarily mixed using a mixer such as a tumbler or Henschel mixer, and then the resulting mixture is melt-kneaded in a mixer such as a Banbury mixer, roll, Brabender, single-screw kneading extruder, twin-screw kneading extruder, kneader, or the like.

The aromatic polycarbonate resin composition of the present invention may also be produced by, for example, a method in which the components are not mixed in advance, or only a part of the components are mixed in advance, and the components are then fed to an extruder using a feeder to perform melt kneading.

In the production of the aromatic polycarbonate resin of the present invention, an additive(s) may be directly added to the molten resin after the polymerization, and the resulting mixture may be kneaded. In cases where an additive(s) is/are added in this manner, a method in which the molten resin is directly introduced into an extruder after the polymerization, and then the additive(s) is/are added thereto, followed by performing melt kneading and pelletization is preferred.

The aromatic polycarbonate resin composition of the present invention may also be produced by, for example, a method in which a part of the components are preliminarily mixed and fed into an extruder, and melt kneading is performed to obtain a resin composition as a masterbatch, followed by mixing the masterbatch with the other component(s) and performing melt kneading of the resulting mixture.

In cases where a hardly dispersible component is to be mixed, the hardly dispersible component may be preliminarily dissolved or dispersed in a solvent such as water or an organic solvent, and kneading may be performed with the resulting solution or dispersion to increase the dispersibility.

Method for Producing Aromatic Polycarbonate Resin Molded Article

The method for producing an aromatic polycarbonate resin molded article of the present invention is a method for obtaining an aromatic polycarbonate resin molded article by injection molding of the polycarbonate resin or the polycarbonate resin composition of the present invention.

The shape, pattern, color, size, and the like of the aromatic polycarbonate resin molded article of the present invention are not limited, and may be appropriately selected depending of the intended use of the molded article. Examples of the aromatic polycarbonate resin molded article include those having various shapes such as board-like shapes, plate-like shapes, rod-like shapes, sheet-like shapes, film-like shapes, cylindrical shapes, ring-like shapes, circular shapes, elliptical shapes, polygonal shapes, irregular shapes, hollow shapes, frame-like shapes, box-like shapes, and panel-like shapes, as well as special shapes. Further, for example, the thermoplastic resin molded article may have an irregular surface, or may have a three-dimensional shape with a three-dimensional curved surface.

The method of the injection molding is not limited, and an arbitrary molding method commonly employed for polycarbonate resins may be employed. Examples of the method include ultra-high-speed injection molding; injection compression molding; two-color molding; hollow molding such as gas assist molding; molding methods using an insulated mold; molding methods using a rapid heating mold; foam molding (including supercritical fluid); insert molding; and IMC (in-mold coating) molding. A molding method using a hot runner method may also be used.

Examples of the molded article include electric and electronic devices, office automation devices, information terminal devices, mechanical components, household electrical appliances, car parts, building components, containers, leisure goods/miscellaneous goods, and components of illuminating devices and the like. Among these, the production method can be especially suitably used for transparent optical members of electric and electronic devices, office automation devices, information terminal devices, household electrical appliances, illuminating devices, and the like. In particular, taking advantage of the excellent fluidity (moldability), transparency, and strength, the present invention can be preferably employed for large molded articles such as automobile window members, and, in particular, optical components such as display members including liquid crystal displays (LCDs). Among such display members, the present invention can be especially preferably employed for light guide plates placed inside backlight units, which are incorporated in display devices and used for guiding light.

EXAMPLES

The present invention is described below more concretely by way of Examples. However, the present invention is not limited to the following Examples, and may be carried out with an arbitrary modification without departing from the spirit of the present invention. Each value in the production conditions and the evaluation results in the following Examples has a meaning as a preferred upper limit or lower limit value in an embodiment of the present invention, and a preferred range may be defined by combination of an upper limit or lower limit value described above and a value in the following Examples, or by combination of values in the Examples. Unless otherwise specified, the term "part" in the following description means "part by mass", which is expressed on a mass basis.

Synthesis Example 1

Synthesis of 1,1-Bis(4-hydroxyphenyl)nonane (BP-C9)

A synthesis example of 1,1-bis(4-hydroxyphenyl)nonane, which is listed in the later-mentioned Table-1, is described below.

Phenol (100 parts by weight) was melted by warming at 40° C., and concentrated hydrochloric acid (1.33 parts by weight) was added thereto. To the resulting mixture, a mixture of nonanal (30.1 parts by weight) and toluene (21.2 parts by weight) was added dropwise for four hours. Thereafter, the mixture was aged at 40° C. for 1 hour, and the reaction was stopped with an aqueous sodium hydrogen carbonate solution. After evaporating phenol from the reaction mixture under reduced pressure, extraction was performed with toluene, and the mixture was washed with water three times. After removing the solvent by distillation, crystallization from toluene and heptane was performed to obtain 24.3 parts by weight of the compound of interest as a white powder. The purity was 98.96, and the melting point was 95° C.

Synthesis Example 2

Synthesis of 1,1-Bis(4-hydroxyphenyl)decane (BP-C10)

A synthesis example of 1,1-bis(4-hydroxyphenyl)decane, which is listed in the later-mentioned Table-1, is described below.

The same synthesis as in Synthesis Example 1 was carried out except that decanal (33.1 parts by weight) was used instead of nonanal. As a result, 23.3 parts by weight of the compound of interest was obtained as a white powder. The purity was 99.4%, and the melting point was 93° C.

Synthesis Example 3

Synthesis of 1,1-Bis(4-hydroxyphenyl)undecane (BP-C11)

The same synthesis as in Synthesis Example 1 was carried out except that undecanal (36.0 parts by weight) was used instead of nonanal. As a result, 26.7 parts by weight of the compound of interest was obtained as a white powder. The purity was 99.3%, and the melting point was 91° C.

Synthesis Example 4

Synthesis of 1,1-Bis(4-hydroxyphenyl)dodecane (BP-C12)

The same synthesis as in Synthesis Example 1 was carried out except that dodecanal (39.0 parts by weight) was used instead of nonanal. As a result, 27.8 parts by weight of the compound of interest was obtained as a white powder. The purity was 99.0%, and the melting point was 86° C.

Synthesis Example 5

Synthesis of 1,1-Bis(4-hydroxyphenyl)nonadecane (BP-C19)

The same synthesis as in Synthesis Example 1 was carried out except that nonadecanal (100 parts by weight) was used instead of nonanal. As a result, 32.3 parts by weight of the compound of interest was obtained as a white powder. The purity was 96.7%, and the melting point was 96° C.

Synthesis Example 6

Synthesis of 2,2-Bis(4-hydroxyphenyl)tridecane (BP-C12Me)

Phenol (100 parts by weight) was melted by warming at 50° C., and concentrated hydrochloric acid (32.9 parts by weight) and 3-mercaptopropionic acid (2.39 parts by weight) were added thereto. To the resulting mixture, 2-tridecanone (36.9 parts by weight) was added dropwise for four hours. Thereafter, the mixture was aged at 70° C. for 16 hours, and the reaction was stopped with an aqueous sodium hydrogen carbonate solution. After evaporating phenol from the reaction mixture under reduced pressure, extraction was performed with toluene, and the mixture was washed with water three times. After evaporating the solvent, purification by silica gel column chromatography (developing solvent, ethyl acetate/hexane) was performed to remove the solvent, to obtain 45.8 parts by weight of the compound of interest as a colorless viscous liquid. The purity was 99.1%.

The compounds of interest in Synthesis Examples 1 to 4 were analyzed under the following analysis conditions.
[Purity]
In 1 part by mass of acetonitrile, 0.01 part by mass of a sample was dissolved. The obtained solution was analyzed using an HPLC analyzer (LC-2010, manufactured by Shimadzu Corporation). The conditions were as follows.
Column: Inertsil ODS3V (manufactured by GL Sciences Inc.)
Eluting solvent: acetonitrile/0.1% by mass ammonium acetate solution
Detector: UV (254 nm)
The purity was determined from the area % at 254 nm.
[Melting Point]
An SMP3 melting point apparatus manufactured by Stuart Scientific was used. The temperature was increased at 2° C./min., and the temperature at the time point when the solid was totally melted was regarded as the melting point.
Table-1 shows the names (abbreviations) of the dihydroxy compounds used as materials of the aromatic polycarbonate resins, and the carbonate-forming compound, used in the following Examples and Comparative Examples.

TABLE 1

| Abbreviation | |
|---|---|
| BPA | 2,2-Bis(4-hydroxyphenyl)propane manufactured by Mitsubishi Chemical Corporation |
| DPC | Carbonate-forming compound Diphenyl carbonate, manufactured by Mitsubishi Chemical Corporation |
| BP-C9 | 1,1-Bis(4-hydroxyphenyl)nonane |
| BP-C10 | 1,1-Bis(4-hydroxyphenyl)decane |
| BP-C11 | 1,1-Bis(4-hydroxyphenyl)undecane |
| BP-C12 | 1,1-Bis(4-hydroxyphenyl)dodecane |
| BP-C19 | 1,1-Bis(4-hydroxyphenyl)nonadecane |
| BP-C1 | Bis(4-hydroxyphenyl)methane manufactured by Honshu Chemical Industry Co., Ltd. |
| BP-C2 | 1,1-Bis(4-hydroxyphenyl)ethane manufactured by Honshu Chemical Industry Co., Ltd. |
| BP-C8 | 1,1-Bis(4-hydroxyphenyl)-2-ethylhexane manufactured by Tokyo Chemical Industry Co., Ltd. |
| BP-C12Me | 2,2-Bis(4-hydroxyphenyl)tridecane |

<Examples 1 to 12> and <Comparative Examples 1 to 7>

Production of Aromatic Polycarbonate Resins

The material dihydroxy compounds and the carbonate-forming compound described in Table-1 were fed to a glass reactor having a capacity of 150 mL equipped with a reactor heater and a reactor pressure regulator, at the material feed amounts described in Table-2. Further, as a catalyst, 2 wt % aqueous cesium carbonate solution was added thereto such that cesium carbonate was contained at 0.5 to 1 μmol (the amount of catalyst described in Table-2) per 1 mol of the total dihydroxy compounds, to prepare each material mixture.

Subsequently, an operation of reducing the pressure in the glass reactor to about 100 Pa (0.75 Torr) and then restoring the pressure with nitrogen to atmospheric pressure was repeated three times, thereby replacing the inside of the reactor with nitrogen. Thereafter, the external temperature of the reactor was adjusted to 220° C. to allow a slow increase in the internal temperature of the reactor, thereby dissolving the mixture.

Subsequently, a stirrer was rotated at 100 rpm. Thereafter, the pressure in the reactor, in terms of the absolute pressure, was reduced from 101.3 kPa (760 Torr) to 13.3 kPa (100 Torr) for 40 minutes, during which phenol produced as a by-product of oligomerization reaction of the dihydroxy compounds and DPC in the reactor was removed by distillation.

Subsequently, while the pressure in the reactor was kept at 13.3 kPa, and while phenol was further removed by distillation, transesterification reaction was carried out for 80 minutes. Thereafter, the external temperature of the reactor was increased to 250° C., and the internal pressure, in terms of the absolute pressure, of the reactor was reduced from 13.3 kPa (100 Torr) to 399 Pa (3 Torr) for 40 minutes while removing distilled phenol to the outside of the system. Thereafter, the external temperature of the reactor was increased to the final polymerization temperature described in Table-2, and the absolute pressure in the reactor was reduced to 30 Pa (about 0.2 Torr). The rotation speed of the stirrer was reduced to 30 rpm. Polycondensation reaction was thus allowed to proceed. When the stirring power of the stirrer in the reactor reached a predetermined value, the polycondensation reaction was stopped. After restoring the absolute pressure in the rector with nitrogen to 101.3 kPa, the polycarbonate resin was extracted from the reactor.

Evaluation of Aromatic Polycarbonate Resins
[Viscosity Average Molecular Weight]
As described above, the viscosity average molecular weight of each of the aromatic polycarbonate resins of Examples 1 to 12 and Comparative Examples 1 to 7 was calculated by determining the intrinsic viscosity (limiting viscosity) [η] (unit, dL/g) of a solution in methylene chloride at 20° C. using an Ubbelohde viscometer (manufactured by Moritomo Rika Kogyo), and applying the resulting value to the Schnell's viscosity equation, that is, $\eta=1.23\times10^{-4} Mv^{0.83}$. Table-2 shows each of the values obtained.

[Glass Transition Temperature (Tg)]
As described above, the glass transition temperature (Tg) of each of the aromatic polycarbonate resins of Examples 1 to 12 and Comparative Examples 1 to 7 was determined using a differential scanning calorimeter (DSC 6220, manufactured by SII) according to JIS-K7121. Table-2 shows each of the values obtained.

[Amount of Terminal Hydroxyl Groups]
As described above, the amount of terminal hydroxyl groups in each of the aromatic polycarbonate resins of Examples 1 to 12 and Comparative Examples 1 to 7 was determined by colorimetry by the titanium tetrachloride/acetic acid method. Table-2 shows each of the values obtained.

[Flow Value (Q Value)]
As described above, the flow value (Q value) of each of the aromatic polycarbonate resins of Examples 1 to 12 and Comparative Examples 1 to 7 was measured using a CFT-500A type flow tester manufactured by Shimadzu Corporation and an orifice of 1-mm diameter×10 mm according to Appendix C of JIS (1999) K7210 at 240° C. at 160 kgf/cm$^2$ with a preheating time of 7 minutes. Table-2 shows each of the values obtained.

[Measurement of Haze (Evaluation of Transparency)]
For evaluation of the transparency of each of the aromatic polycarbonate resins of Examples 1 to 12 and Comparative Examples 1 to 7, each aromatic polycarbonate resin obtained as described above was dried at 100° C. (80° C. for only Example 12) for 5 to 7 hours using a hot-air drier, and then molded into a plate-shaped test piece having a thickness of 3 mm using a C. Mobile 0813-type injection molding machine manufactured by Shinko Sellbic Co., Ltd., under the following conditions: cylinder temperature, 300° C.;

mold temperature, 60° C.; injection rate, 40 mm/sec.; cycle time, 40 sec. Thereafter, the haze (unit, %) was measured using a COH 400-type color/turbidity measuring instrument manufactured by Nippon Denshoku Industries Co., Ltd. under the following conditions: D65 light source; viewing area, 10°; measurement diameter, 10 mm. The haze is an index of turbidity of a resin material. A lower haze means a higher transparency, which is preferred. Table-2 shows each of the values obtained. When the haze value in the measurement at a thickness of 3 mm is not more than 0.5%, the polycarbonate resin can be judged to be suitable for use in optical members. Table-2 shows the values obtained.

[Izod Impact Strength (Evaluation of Impact Resistance)]

For evaluation of the impact strength of each of the aromatic polycarbonate resins of Examples 1 to 12 and Comparative Examples 1 to 7, each aromatic polycarbonate resin obtained as described above was dried at 100° C. (80° C. for only Example 12) for 5 to 7 hours using a hot-air drier, and then molded into an Izod impact test piece according to ASTM-D256 having a thickness of 3.2 mm using a C. Mobile 0813-type injection molding machine manufactured by Shinko Sellbic Co., Ltd., under the following conditions: cylinder temperature, 300° C.; mold temperature, 60° C.; injection rate, 40 mm/sec.; cycle time, 40 sec. Thereafter, using a notching tool manufactured by Toyo Seiki Seisaku-sho, Ltd., a 0.25R V-notch was formed by cutting, and an Izod impact test was carried out according to the above ASTM-D256 to determine the Izod impact strength (unit: J/m). Table-2 shows each of the values obtained. A higher value means a better impact resistance, which is preferred.

TABLE 2

| | | | Example 1 | Example 2 | Example 3 | Example 4 | Example 5 | Example 6 | Example 7 |
|---|---|---|---|---|---|---|---|---|---|
| Monomer composition | BPA | mol % | 90 | 90 | 90 | 90 | 97 | 96 | 95 |
| | BP-C9 | | 10 | | | | | | |
| | BP-C10 | | | 10 | 10 | | | | |
| | BP-C11 | | | | | 10 | | | |
| | BP-C12 | | | | | | 3 | 4 | 5 |
| | BP-C1 | | | | | | | | |
| | BP-C2 | | | | | | | | |
| | BP-C8 | | | | | | | | |
| | BP-C19 | | | | | | | | |
| | BP-C12Me | | | | | | | | |
| Material feed amount | BPA | g | 101.31 | 100.71 | 100.71 | 100.12 | 116.36 | 108.89 | 107.90 |
| | BP-C9 | | 15.40 | | | | | | |
| | BP-C10 | | | 16.00 | 16.00 | | | | |
| | BP-C11 | | | | | 16.59 | | | |
| | BP-C12 | | | | | | 5.35 | 8.82 | 8.81 |
| | BP-C1 | | | | | | | | |
| | BP-C2 | | | | | | | | |
| | BP-C8 | | | | | | | | |
| | BP-C19 | | | | | | | | |
| | BP-C12Me | | | | | | | | |
| | DPC | | 112.49 | 111.83 | 111.83 | 111.17 | 115.81 | 114.56 | 113.50 |
| Amount of Catalyst | | mol/1 mol of total dihydroxy compounds | 0.5 | 0.5 | 0.5 | 0.5 | 0.5 | 0.5 | 0.5 |
| Final polymerization temperature | | ° C. | 260 | 260 | 270 | 260 | 260 | 260 | 260 |
| Viscosity average molecular weight | | | 14000 | 16900 | 14500 | 14600 | 14100 | 14700 | 13800 |
| Intrinsic viscosity | | dL/g | 0.340 | 0.397 | 0.350 | 0.352 | 0.342 | 0.354 | 0.336 |
| Tg | | ° C. | 123 | 120 | 121 | 117 | 137 | 134 | 121 |
| Amount of terminal hydroxyl groups | | ppm | 1060 | 610 | 740 | 1190 | 470 | 560 | 890 |
| Q value | | $10^{-2}$ cm$^3$/sec. | 27 | 11 | 24 | 27 | 23 | 32 | 31 |
| Haze | | % | 0.4 | 0.4 | 0.4 | 0.4 | 0.3 | 0.4 | 0.3 |
| Izod impact test | | J/m | 23 | 139 | 64 | 46 | 61 | 47 | 50 |

| | | | Example 8 | Example 9 | Example 10 | Example 11 | Example 12 | Comparative Example 1 | Comparative Example 2 |
|---|---|---|---|---|---|---|---|---|---|
| Monomer composition | BPA | mol % | 90 | 90 | 90 | 85 | 80 | 100 | 100 |
| | BP-C9 | | | | | | | | |
| | BP-C10 | | | | | | | | |
| | BP-C11 | | | | | | | | |
| | BP-C12 | | | 10 | 10 | 10 | 15 | 20 | |
| | BP-C1 | | | | | | | | |
| | BP-C2 | | | | | | | | |
| | BP-C8 | | | | | | | | |
| | BP-C19 | | | | | | | | |
| | BP-C12Me | | | | | | | | |

TABLE 2-continued

| | | | | | | | | | |
|---|---|---|---|---|---|---|---|---|---|
| Material feed amount | BPA | g | 99.54 | 99.54 | 99.53 | 91.61 | 84.07 | 116.71 | 116.71 |
| | BP-C9 | | | | | | | | |
| | BP-C10 | | | | | | | | |
| | BP-C11 | | | | | | | | |
| | BP-C12 | | 17.17 | 17.17 | 17.18 | 25.10 | 32.64 | | |
| | BP-C1 | | | | | | | | |
| | BP-C2 | | | | | | | | |
| | BP-C8 | | | | | | | | |
| | BP-C19 | | | | | | | | |
| | BP-C12Me | | | | | | | | |
| | DPC | | 108.45 | 110.53 | 110.52 | 107.70 | 104.53 | 117.73 | 117.73 |
| Amount of Catalyst | | mol/1 mol of total dihydroxy compounds | 1 | 0.5 | 0.5 | 0.5 | 1 | 0.5 | 0.5 |
| Final polymerization temperature | | °C. | 280 | 270 | 260 | 270 | 280 | 260 | 260 |
| Viscosity average molecular weight | | | 21000 | 16100 | 14000 | 18000 | 18500 | 14000 | 12600 |
| Intrinsic viscosity | | dL/g | 0.476 | 0.382 | 0.340 | 0.419 | 0.428 | 0.340 | 0.311 |
| Tg | | °C. | 117 | 113 | 112 | 105 | 98 | 138 | 132 |
| Amount of terminal hydroxyl groups | | ppm | 930 | 500 | 690 | 550 | 500 | 540 | 650 |
| Q value | | $10^{-2}$ cm$^3$/sec. | 11 | 18 | 42 | 34 | 21 | 11 | 28 |
| Haze | | % | 0.4 | 0.4 | 0.3 | 0.3 | 0.4 | 0.4 | 0.3 |
| Izod impact test | | J/m | 133 | 62 | 74 | 38 | 74 | 20 | 11 |

| | | | Comparative Example 3 | Comparative Example 4 | Comparative Example 5 | Comparative Example 6 | Comparative Example 7 |
|---|---|---|---|---|---|---|---|
| Monomer composition | BPA | mol % | 50 | 50 | 90 | 90 | 90 |
| | BP-C9 | | | | | | |
| | BP-C10 | | | | | | |
| | BP-C11 | | | | | | |
| | BP-C12 | | | | | | |
| | BP-C1 | | | 50 | | | |
| | BP-C2 | | | | 50 | | |
| | BP-C8 | | | | | 10 | |
| | BP-C19 | | | | | 10 | |
| | BP-C12Me | | | | | | 10 |
| Material feed amount | BPA | g | 62.18 | 60.20 | 101.91 | 50.00 | 90.00 |
| | BP-C9 | | | | | | |
| | BP-C10 | | | | | | |
| | BP-C11 | | | | | | |
| | BP-C12 | | | | | | |
| | BP-C1 | | | 54.53 | | | |
| | BP-C2 | | | | 56.51 | | |
| | BP-C8 | | | | | 14.80 | |
| | BP-C19 | | | | | 11.02 | |
| | BP-C12Me | | | | | | 16.14 |
| | DPC | | 124.27 | 120.33 | 113.69 | 54.22 | 97.59 |
| Amount of Catalyst | | mol/1 mol of total dihydroxy compounds | 5 | 0.5 | 0.5 | 1 | 1 |
| Final polymerization temperature | | °C. | 280 | 260 | 260 | 260 | 260 |
| Viscosity average molecular weight | | | 16400 | 14100 | 12400 | 16300 | 13000 |
| Intrinsic viscosity | | dL/g | 0.387 | 0.342 | 0.307 | 0.385 | 0.320 |
| Tg | | °C. | 113 | 130 | 130 | 104 | 102 |
| Amount of terminal hydroxyl groups | | ppm | 490 | 930 | 1640 | 1470 | 1020 |
| Q value | | $10^{-2}$ cm$^3$/sec. | 27 | 25 | 22 | 24 | 26 |
| Haze | | % | 0.5 | 0.5 | 0.4 | 0.6 | 0.7 |
| Izod impact test | | J/m | 19 | 8 | 13 | 10 | 11 |

Based on comparison among Examples 1 to 12 and Comparative Examples 1 and 2, it can be seen that the aromatic polycarbonate resins of the present invention exhibit high Izod impact strength even at high Q values, and therefore that those aromatic polycarbonate resins have excellent balances between high fluidity and impact resistance. More specifically, the conventional bisphenol A-type aromatic polycarbonate of Comparative Example 1, whose Q value is 11, has an Izod impact strength of 20 J/m. On the other hand, it can be seen that Example 2, which has the same Q value, has high impact strength with an Izod impact strength of 139 J/m. Further, the conventional bisphenol A-type aromatic polycarbonate of Comparative Example 2, whose Q value is 28, has an Izod impact strength of 11 J/m. On the other hand, it can be seen that Examples 6 and 7, each of which has an equivalent or higher Q value, have Izod impact strengths of 47 to 50 J/m.

In the aromatic polycarbonate resins exemplified in Comparative Examples 3, 4, and 6, conventionally proposed aromatic polycarbonate resins other than bisphenol A-type resins are included, and the carbon number in the $R^1$ group in Formula (1) of the carbonate structure (A) according to the present invention is not within the range defined in the present invention. It can be seen that those resins show Izod impact strengths of 8 to 19 J/m at Q values of 24 to 27, and therefore that the resins have insufficient impact resistance within the range of fluidity defined in the present invention.

Further, Comparative Example 7 exemplifies a conventionally proposed aromatic polycarbonate resin having a structural unit different from the carbonate structure (A) according to the present invention. It can be seen that this resin shows an Izod impact strength of 11 J/m at a Q value of 26, and therefore that the resin has insufficient impact resistance within the range of fluidity defined in the present invention.

Thus, it is again clear that inclusion of a particular structural unit like the carbonate structural unit (A) according to the present invention is necessary for obtaining an aromatic polycarbonate resin having an excellent balance between high fluidity and impact strength.

<Examples 13 to 18> and <Comparative Examples 8 and 9>

Production of Aromatic Polycarbonate Resins

The material dihydroxy compounds and the carbonate-forming compound described in Table-1 were mixed at the material feed amounts described in Table-3. Further, as a catalyst, 2 wt % aqueous cesium carbonate solution was added thereto such that cesium carbonate was contained at 0.5 μmol per 1 mol of the total dihydroxy compounds, to prepare each material mixture. The mixture was then fed to a first reactor having a capacity of 200 L equipped with a stirrer, heating medium jacket, vacuum pump, and reflux condenser.

Subsequently, an operation of reducing the pressure in the first reactor to 1.33 kPa (10 Torr) and then restoring the pressure with nitrogen to atmospheric pressure was repeated five times, thereby replacing the inside of the first reactor with nitrogen. Thereafter, a heating medium at a temperature of 230° C. was passed through the heating medium jacket to allow a slow increase in the internal temperature of the first reactor, thereby dissolving the mixture. Thereafter, the stirrer was rotated at 300 rpm, and the temperature in the heating medium jacket was controlled to keep the internal temperature of the first reactor at 220° C. Thereafter, the pressure in the first reactor, in terms of the absolute pressure, was reduced from 101.3 kPa (760 Torr) to 13.3 kPa (100 Torr) for 40 minutes, during which phenol produced as a by-product of oligomerization reaction of the dihydroxy compounds and DPC in the first reactor was removed by distillation.

Subsequently, while the pressure in the first reactor was kept at 13.3 kPa, and while phenol was further removed by distillation, transesterification reaction was carried out for 80 minutes. The absolute pressure in the system was restored with nitrogen to 101.3 kPa, and then increased to 0.2 MPa in terms of the gauge pressure. The oligomer in the first reactor was transferred under the pressure to a second reactor through a transfer pipe preliminarily heated to not less than 200° C. The capacity of the second reactor was 200 L, and the reactor was equipped with a stirrer, heating medium jacket, vacuum pump, and reflux condenser. Its internal pressure had been adjusted to atmospheric pressure, and its internal temperature had been adjusted to 240° C.

The oligomer transferred under the pressure into the second reactor was stirred at 38 rpm, and the internal temperature was increased by the heating medium jacket. The absolute pressure in the second reactor was reduced from 101.3 kPa to 13.3 kPa for 40 minutes. Thereafter, the temperature was kept increased, and the internal pressure, in terms of the absolute pressure, was reduced from 13.3 kPa to 399 Pa (3 Torr) for 40 minutes while removing distilled phenol to the outside of the system. The temperature was further kept increased, and when the absolute pressure in the second reactor reached 70 Pa (about 0.5 Torr), the pressure of 70 Pa was maintained to perform polycondensation reaction. The final internal temperature of the second reactor was 255° C. When the stirring power of the stirrer in the second reactor reached a predetermined value, the polycondensation reaction was stopped. After restoring the pressure in the rector with nitrogen, pressure was applied to allow extraction of the resin from the bottom of the tank, followed by cooling the resin in a water-cooling tank to obtain a strand-like product. The product was then cut by a pelletizer to obtain a pellet-shaped aromatic polycarbonate resin. Table-3 shows the evaluation results of the aromatic polycarbonate resins obtained. The evaluation methods for the viscosity average molecular weight, the intrinsic viscosity, the amount of terminal hydroxyl groups, the Tg value, and the Q value for each of Examples 13 to 18 and Comparative Examples 8 and 9 in Table-3 were the same as those for the aromatic polycarbonate resins of Examples 1 to 12 and Comparative Examples 1 to 7.

TABLE 3

|  |  |  | Example 13 | Example 14 | Example 15 | Example 16 | Example 17 | Example 18 | Comparative Example 8 | Comparative Example 9 |
|---|---|---|---|---|---|---|---|---|---|---|
|  |  |  |  |  |  | Abbreviation |  |  |  |  |
|  |  | Unit | PC1 | PC2 | PC3 | PC4 | PC5 | PC6 | PC7 | PC8 |
| Composition ratios of dihydroxy compound structural units in aromatic polycarbonate resin | BPA | mol % | 98.5 | 97 | 96 | 95 | 93 | 90 | 100 | 100 |
|  | BP-C12 |  | 1.5 | 3 | 4 | 5 | 7 | 10 |  |  |
| Material feed amount | BPA | g | 6545 | 6393 | 6293 | 6194 | 5999 | 5714 | 6700 | 6700 |
|  | BP-C12 |  | 155 | 307 | 407 | 506 | 701 | 986 |  |  |
|  | DPC |  | 6703 | 6648 | 6612 | 6577 | 6507 | 6405 | 6759 | 6727 |
| Viscosity average molecular weight |  |  | 12300 | 12600 | 12600 | 13200 | 13200 | 13900 | 12000 | 13000 |

TABLE 3-continued

|  | Unit | Example 13 | Example 14 | Example 15 | Example 16 | Example 17 | Example 18 | Comparative Example 8 | Comparative Example 9 |
|---|---|---|---|---|---|---|---|---|---|
|  |  | Abbreviation |  |  |  |  |  |  |  |
|  |  | PC1 | PC2 | PC3 | PC4 | PC5 | PC6 | PC7 | PC8 |
| Intrinsic viscosity | dL/g | 0.305 | 0.311 | 0.311 | 0.324 | 0.324 | 0.338 | 0.299 | 0.320 |
| Tg | °C. | 136 | 132 | 132 | 121 | 120 | 112 | 132 | 136 |
| Amount of terminal hydroxyl groups | ppm | 470 | 480 | 720 | 560 | 420 | 370 | 670 | 720 |
| Q value | $10^{-2}$ cm$^3$/sec. | 27 | 27 | 32 | 30 | 30 | 30 | 30 | 16 |

<Examples 19 to 24> and <Comparative Example 10>

Production of Aromatic Polycarbonate Resin Composition Pellets

The aromatic polycarbonate resins (PC1 to PC8) described above in Table-3, and the other aromatic polycarbonate resin and the additive components described below in Table-4, were blended at the ratios (parts by mass) described below in Table-5, and then mixed. Each resulting mixture was fed to TEX30HSS, manufactured by Japan Steel Works, Ltd., which has one vent, and kneaded at a screw speed of 150 rpm, discharge rate of 15 kg/h, and barrel temperature of 240° C. The molten resin, extruded in a strand shape, was rapidly cooled in a water tank, and then pelletized using a pelletizer to obtain pellets of each aromatic polycarbonate resin composition.

TABLE 4

| Abbreviation | |
|---|---|
| PC9 | Bisphenol A-type aromatic polycarbonate resin manufactured by Mitsubishi Engineering-Plastics Corporation; NOVAREX (registered trademark) M7020AD2; Mv: 15,100 (Q value: 6.6) |
| A | Heat stabilizer 3,9-bis(2,6-di-tert-butyl-4-methylphenoxy)-2,4,8,10-tetraoxa-3,9-diphosphaspiro[5.5]undecane Adekastab (registered trademark) PEP-36, manufactured by ADEKA Corporation |
| B | Catalyst deactivator Butyl paratoluenesulfonate, manufactured by Tokyo Chemical Industry Co., Ltd. |

The evaluation methods for the Tg value and the Q value for each of the polycarbonate resin compositions in Examples 19 to 24 and Comparative Example 10 in Table-5 were the same as those in Examples 1 to 12 and Comparative Examples 1 to 7.

[Evaluation of Impact Resistance]

The pellets of each aromatic polycarbonate resin composition obtained by the production method described above were dried at 100° C. for 5 to 7 hours using a hot-air drier, and then subjected to injection molding using a J75EII type injection molding machine manufactured by Japan Steel Works Ltd. at a cylinder temperature of 240° C. and a mold temperature of 70° C. with a molding cycle of 40 seconds, to mold an Izod impact test piece having a thickness of 3.2 mm according to ASTM-D256. Thereafter, using a notching tool manufactured by Toyo Seiki Seisaku-sho, Ltd., a 0.25R V-notch was formed by cutting, and an Izod impact test was carried out according to the above ASTM-D256 to determine the Izod impact strength (unit: J/m).

[Evaluation of Bending Resistance]

By the same method as described above, a molded article having a length of 125 mm, width of 12.5 mm, and thickness of 3 mm was molded. Using the obtained molded article as a test piece, and using an RTM-100 type universal tester manufactured by Orientec Co., Ltd., a bending stress was applied in the direction of the thickness of 3 mm described above by a pressure wedge to give a displacement of up to 10 mm under the following conditions: distance between supporting points, 64 mm; test speed, 2 mm/sec. This test was carried out three times, and the number of times in which breakage occurred was determined as the number of times of bending breakage (unit: times). The mean value of the displacements in cases of breakage was determined as the bending breaking displacement (unit: mm), and the mean value of the bending strengths at breakage was determined as the bending breaking strength (unit: MPa). A smaller number of times of bending breakage is preferred since it means a better toughness of the material. A larger bending displacement is preferred since it means that cracking is less likely to occur even with a larger displacement. A higher bending strength is preferred since it means a higher material strength.

TABLE 5

|  |  |  | Example 19 | Example 20 | Example 21 | Example 22 | Example 23 | Example 24 | Comparative Example 10 |
|---|---|---|---|---|---|---|---|---|---|
| Resin composition | PC1 | Parts by mass | 90 |  |  |  |  |  |  |
|  | PC2 |  |  | 93 |  |  |  |  |  |
|  | PC3 |  |  |  | 87 |  |  |  |  |
|  | PC4 |  |  |  |  | 100 |  |  |  |
|  | PC5 |  |  |  |  |  | 100 |  |  |
|  | PC6 |  |  |  |  |  |  | 100 |  |
|  | PC7 |  |  |  |  |  |  |  | 100 |
|  | PC8 |  | 10 | 7 |  |  |  |  |  |
|  | PC9 |  |  |  | 13 |  |  |  |  |
|  | A |  | 0.03 | 0.03 | 0.03 | 0.03 | 0.03 | 0.03 | 0.03 |
|  | B |  | 0.0005 | 0.0005 | 0.0004 | 0.0005 | 0.0005 | 0.0005 | 0.0005 |

TABLE 5-continued

|  |  | Example 19 | Example 20 | Example 21 | Example 22 | Example 23 | Example 24 | Comparative Example 10 |
|---|---|---|---|---|---|---|---|---|
| Ratio of carbonate structural unit (A) | mol % | 1.3 | 2.8 | 3.5 | 5.0 | 7.0 | 10.0 | 0.0 |
| Tg | °C. | 136 | 132 | 132 | 121 | 117 | 113 | 132 |
| Q value | $10^{-2}$ cm$^3$/sec. | 29 | 26 | 28 | 32 | 31 | 32 | 30 |
| Izod impact test | J/m | 19 | 25 | 35 | 31 | 40 | 57 | 11 |
| Number of times of bending breakage | /3 | — | — | — | 1 | 0 | 1 | 3 |
| Bending breaking displacement | mm | — | — | — | 5.1 | No breakage | 4.5 | 3.6 |
| Bending breaking strength | MPa | — | — | — | 47 | No breakage | 41 | 35 |

*In the table, (—) represents no measurement.

As is evident from Examples 19 to 24 and Comparative Example 10, the aromatic polycarbonate resin of the present invention has an excellent balance between the fluidity and the impact resistance also in cases where it is prepared into an aromatic polycarbonate resin composition. In particular, even in cases where an extremely high fluidity with a Q value of not less than 20 is given, the resin has a surprisingly high impact strength.

It can be seen that, in the conventional bisphenol A-type aromatic polycarbonate resin of Comparative Example 10, cracking occurs even with a relatively small displacement; the rate of occurrence of cracking itself is high; and the bending strength is low. In contrast, it can be seen that, in the aromatic polycarbonate resins of Examples 22 and 23 of the present invention, the bending strength is high; cracking is less likely to occur; and the bending resistance is high.

It can thus be seen that the aromatic polycarbonate resins and the aromatic polycarbonate resin compositions of the present invention have excellent fluidity, impact resistance, bending resistance, hue, brightness, and thermal stability, and are therefore suitably applicable to thin-wall molded articles and optical members such as light guide plates.

What is claimed is:

1. An aromatic polycarbonate resin comprising:
   a carbonate structural unit (A) represented by the following Formula (1):

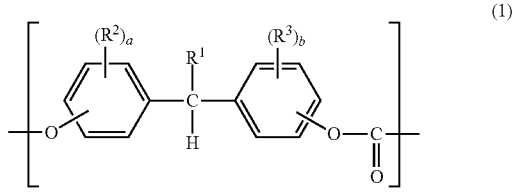

(1)

wherein in Formula (1), R$^1$ represents C$_{11}$-C$_{16}$ alkyl or alkenyl; R$^2$ and R$^3$ each independently represent a C$_1$-C$_{15}$ monovalent hydrocarbon group; and a and b each independently represent an integer of 0 to 4; and
a carbonate structural unit (B) represented by the following Formula (2):

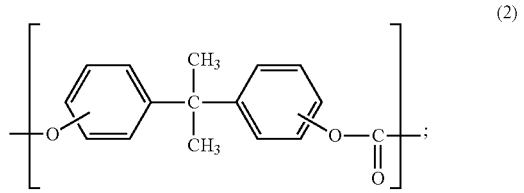

(2)

said aromatic polycarbonate resin satisfying the following (i) and (ii):
(i) the flow value (Q value) as measured using a Koka flow tester according to Appendix C of JIS (1999) K7210 at 240° C. at 160 kgf/cm$^2$ is not less than 6 (unit: $10^{-2}$ cm$^3$/sec.); and
(ii) the glass transition temperature (Tg) is 90 to 145° C.

2. The aromatic polycarbonate resin according to claim 1, wherein the ratio of said carbonate structural unit (A) to the total carbonate structural units in said aromatic polycarbonate resin is 1 to 25 mol %.

3. The aromatic polycarbonate resin according to claim 1, wherein said carbonate structural unit (A) includes at least one of the following carbonate structural units represented by Formula (6):

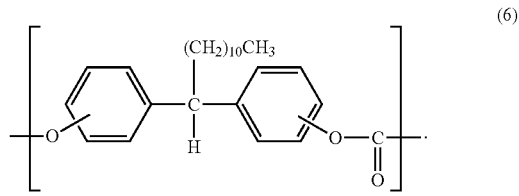

(6)

4. The aromatic polycarbonate resin according to claim 1, wherein the Izod impact value as measured according to ASTM D256 is not less than 20 J/m.

5. The aromatic polycarbonate resin according to claim 1, wherein the flow value (Q value) as measured using a Koka flow tester according to Appendix C of JIS (1999) K7210 at 240° C. at 160 kgf/cm$^2$ is not less than 20 (unit: $10^{-2}$ cm$^3$/sec.).

6. An aromatic polycarbonate resin composition comprising the aromatic polycarbonate resin according to claim 1, and at least one additive selected from the group consisting of heat stabilizers, antioxidants, ultraviolet absorbers, brightness improvers, dyes, pigments, and mold release agents.

7. The aromatic polycarbonate resin composition according to claim 6, wherein the Izod impact value as measured according to ASTM D256 is not less than 20 J/m.

8. The aromatic polycarbonate resin composition according to claim 6, wherein the flow value (Q value) as measured using a Koka flow tester according to Appendix C of JIS (1999) K7210 at 240° C. at 160 kgf/cm$^2$ is not less than 20 (unit: $10^{-2}$ cm$^3$/sec.).

9. A method for producing an aromatic polycarbonate resin molded article, comprising:
   injection molding the aromatic polycarbonate resin of claim 1.

10. A method for producing an aromatic polycarbonate resin molded article, comprising:
   injection molding the aromatic polycarbonate resin composition of claim 6.

11. The aromatic polycarbonate resin composition according to claim 6, wherein the flow value (Q value) as measured using a Koka flow tester according to Appendix C of JIS (1999) K7210 at 240° C. at 160 kgf/cm$^2$ is not less than 25 (unit: $10^{-2}$ cm$^3$/sec.).

12. The aromatic polycarbonate resin composition according to claim 6, wherein the viscosity average molecular weight (Mv) of the aromatic polycarbonate resin composition is not more than 17,500.

\* \* \* \* \*